US012703179B2

(12) United States Patent
Hanawa

(10) Patent No.: US 12,703,179 B2
(45) Date of Patent: Aug. 11, 2026

(54) PRINTING APPARATUS AND METHOD OF CONTROLLING PRINTING APPARATUS

(71) Applicant: SEIKO EPSON CORPORATION, Tokyo (JP)

(72) Inventor: Keita Hanawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 204 days.

(21) Appl. No.: 18/418,032

(22) Filed: Jan. 19, 2024

(65) Prior Publication Data

US 2024/0246334 A1 Jul. 25, 2024

(30) Foreign Application Priority Data

Jan. 20, 2023 (JP) ................................ 2023-006945

(51) Int. Cl.

*B41J 3/407* (2006.01)
*B41J 2/045* (2006.01)
*B41J 25/308* (2006.01)
*D06P 5/30* (2006.01)

(52) U.S. Cl.

CPC ....... *B41J 2/04508* (2013.01); *B41J 2/04526* (2013.01); *B41J 2/04586* (2013.01); *B41J 3/4078* (2013.01); *D06P 5/30* (2013.01)

(58) Field of Classification Search

CPC ........ B41J 25/001; B41J 29/38; B41J 29/393; B41J 3/4078

See application file for complete search history.

(56) References Cited

U.S. PATENT DOCUMENTS

2003/0197750 A1 10/2003 Iwatsuki et al.
2011/0199412 A1* 8/2011 Nakayama ............... B41J 29/38 347/14
2020/0276806 A1* 9/2020 Fujimaki ................. B41J 11/06
2022/0169008 A1* 6/2022 Nakano .................... B41J 29/13

FOREIGN PATENT DOCUMENTS

JP 2003-311938 A 11/2003

* cited by examiner

*Primary Examiner* — Scott A Richmond
(74) *Attorney, Agent, or Firm* — WORKMAN NYDEGGER

(57) ABSTRACT

A control unit performs stop control for stopping an interference detection unit to stop at a stop position when the interference detection unit detects interference as a result of performing first movement control for moving the interference detection unit to one side in a second direction, and performs second movement control for moving the interference detection unit to a predetermined position to the other side opposite to the one side in the second direction. The control unit performs the second movement control, and then performs third movement control for moving the interference detection unit to the one side again. The control unit performs adjustment control for causing a position adjustment unit to perform adjustment so that an interval between a head and a support surface is increased between the stop control and the third movement control.

11 Claims, 12 Drawing Sheets

PRINTING APPARATUS AND METHOD OF CONTROLLING PRINTING APPARATUS

The present application is based on, and claims priority from JP Application Serial Number 2023-006945, filed Jan. 20, 2023, the disclosure of which is hereby incorporated by reference herein in its entirety.

BACKGROUND

1. Technical Field

The present disclosure relates to a printing apparatus and a method of controlling the printing apparatus.

2. Related Art

For example, JP-A-2003-311938 discloses a printing apparatus that performs printing on a medium such as a T-shirt. In such a printing apparatus, it is possible to move the medium from the outside of a housing to the inside of the housing by moving a medium support unit, on which the medium is placed, in the horizontal direction, after the medium is placed on a support surface of the medium support unit on the outside of the housing. With this, after the medium is placed on the support surface on the outside of the housing, it is possible to perform printing on the medium that is moved from the outside of the housing to the inside of the housing. Further, such a printing apparatus includes an interference detection unit that detects interference with respect to a head as the medium support unit moves.

However, in such a printing apparatus, when interference with respect to the head is detected, an interval between the head and the support surface needs to be adjusted again by stopping movement of the medium support portion at a stop position and then returning the support unit from the stop position to an initial position. Thus, it has been desired to improve operational efficiency associated with interference with respect to a head.

SUMMARY

In order to solve the above-mentioned problem, a printing apparatus includes a medium support unit including a support surface configured to support at least a printing region of a medium, a medium accommodation unit configured to accommodate a region of the medium that is not supported by the support surface, a head configured to eject a liquid onto the medium supported by the support surface, an interference detection unit configured to detect interference with respect to the head, a first moving unit configured to move the head in a first direction parallel to the support surface, a second moving unit configured to move the interference detection unit together with the head in a second direction being parallel to the support surface and intersecting with the first direction, a position adjustment unit configured to adjust an interval between the head and the support surface in a third direction intersecting with the support surface, and a control unit configured to control the first moving unit, the second moving unit, and the position adjustment unit, wherein the control unit performs stop control for stopping the interference detection unit at a stop position when the interference detection unit detects interference as a result of performing first movement control for moving the interference detection unit to one side in the second direction, performs second movement control for moving the interference detection unit to a predetermined position to the other side opposite to the one side in the second direction, then performs third movement control for moving the interference detection unit to the one side, and performs adjustment control for causing the position adjustment unit to perform adjustment to increase the interval between the head and the support surface, based on a detection result by the interference detection unit between the stop control and the third movement control.

In order to solve the above-mentioned problem, a method of controlling a printing apparatus includes: executing, by a control unit of a printing apparatus, first-direction movement control processing for moving a head in a first direction parallel to a support surface configured to support at least a printing region of a medium, the head being configured to eject a liquid onto the medium supported by the support surface; and second-direction movement control processing for moving an interference detection unit in a second direction being parallel to the support surface and intersecting with the first direction, the interference detection unit being configured to detect interference with respect to the head, wherein the control unit of the printing apparatus executes first movement control processing for moving the interference detection unit to one side in the second direction in the second-direction movement control processing, stop control processing for stopping the interference detection unit at a stop position in the second-direction movement control processing when the interference detection unit detects interference as a result of executing the first movement control processing, second movement control processing for moving the interference detection unit to a predetermined position to the other side opposite to the one side in the second direction in the second-direction movement control processing after the stop control processing is executed, third movement control processing for moving the interference detection unit to the one side again in the second-direction movement control processing after the second movement control processing is executed, and adjustment control processing for performing adjustment so that an interval between the head and the support surface is increased in a third direction intersecting with the support surface, based on a detection result by the interference detection unit between the stop control processing and the third movement control processing in the second-direction movement control processing.

DESCRIPTION OF EMBODIMENTS

First Exemplary Embodiment

A printing apparatus and a method of controlling a printing apparatus according to an exemplary embodiment are described below. In the following description, a direction intersecting (for example, orthogonal to) a vertical direction Z is referred to as a width direction X, and a direction intersecting the vertical direction Z and the width direction X is referred to as a front-rear direction Y. One side in the width direction X is referred to as a first width direction X1, and the other side in the width direction X is referred to as a second width direction X2. One side in the front-rear direction Y is referred to as a front side Y1, and the other side in the front-rear direction Y is referred to as a rear side Y2. The upper side in the vertical direction Z is referred to as an upper side Z1, and the lower side in the vertical direction Z is referred to as a lower side Z2. The width direction X corresponds to an example of a first direction. The front-rear direction Y corresponds to an example of a second direction. The front side Y1 corresponds to an example of one side. The rear side Y2 corresponds to an example of the other side. The vertical direction Z corresponds to an example of a third direction.

Printing Apparatus 10

Figure 1:
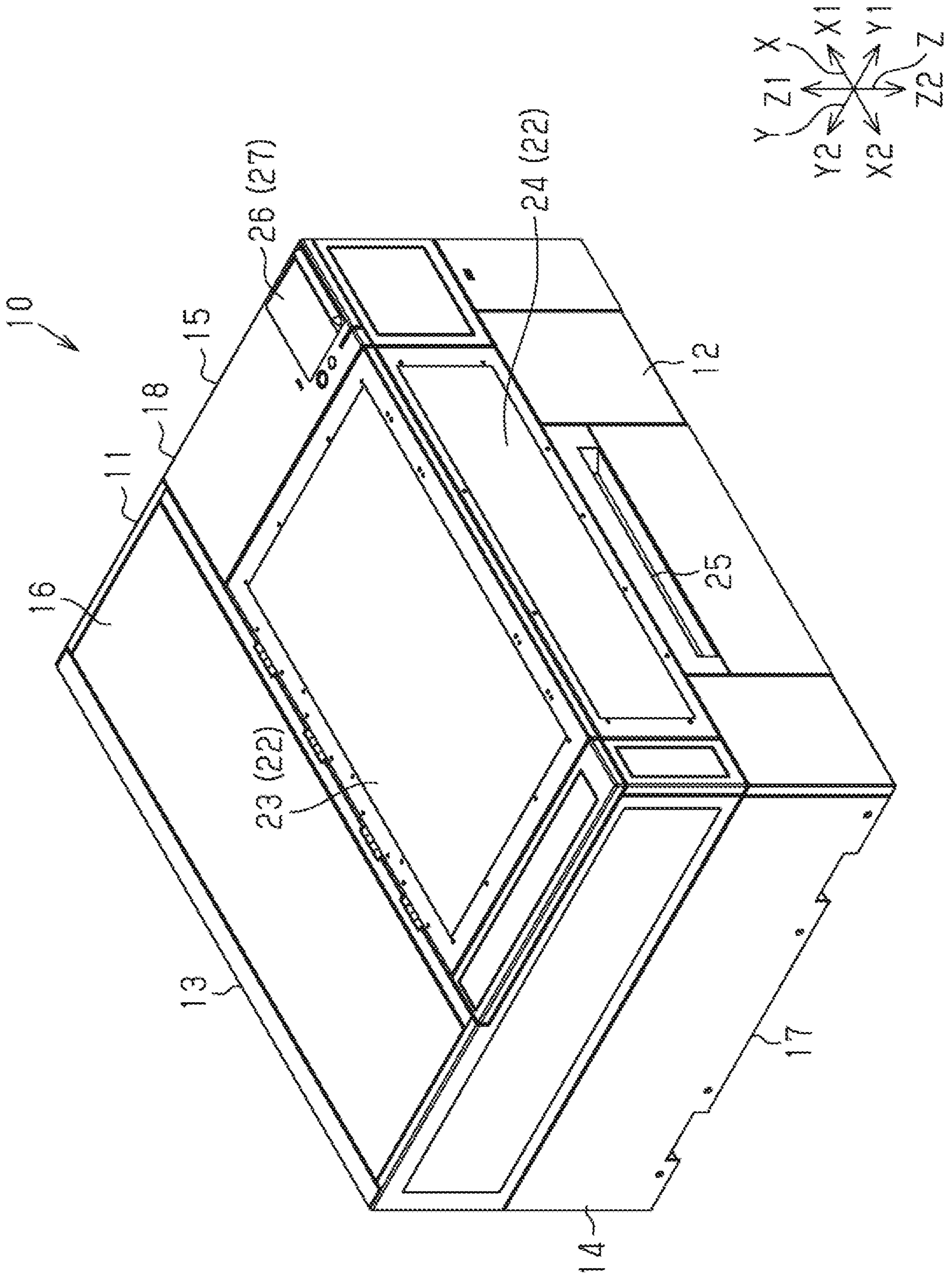
FIG. 1 is a perspective view illustrating a printing apparatus.

A printing apparatus 10 is configured to perform printing on a medium, as illustrated in FIG. 1. The printing apparatus 10 may be configured to perform printing on a medium by ejecting a liquid. The printing apparatus 10 may be configured to perform printing on a flexible medium, such as a T-shirt. The printing apparatus 10 may be configured such that a medium is placed in the interior thereof by a user.

Housing 11

The printing apparatus 10 includes a housing 11. The housing 11 may have a rectangular shape. The housing 11 includes a front surface 12 facing the front side Y1. The housing 11 includes a back surface 13 facing the rear side Y2. The housing 11 includes a left side surface 14 facing the second width direction X2. The housing 11 includes a right side surface 15 facing the first width direction X1. The housing 11 includes a top surface 16 facing the upper side Z1. The housing 11 includes a bottom surface 17 facing the lower side Z2.

Figure 2:
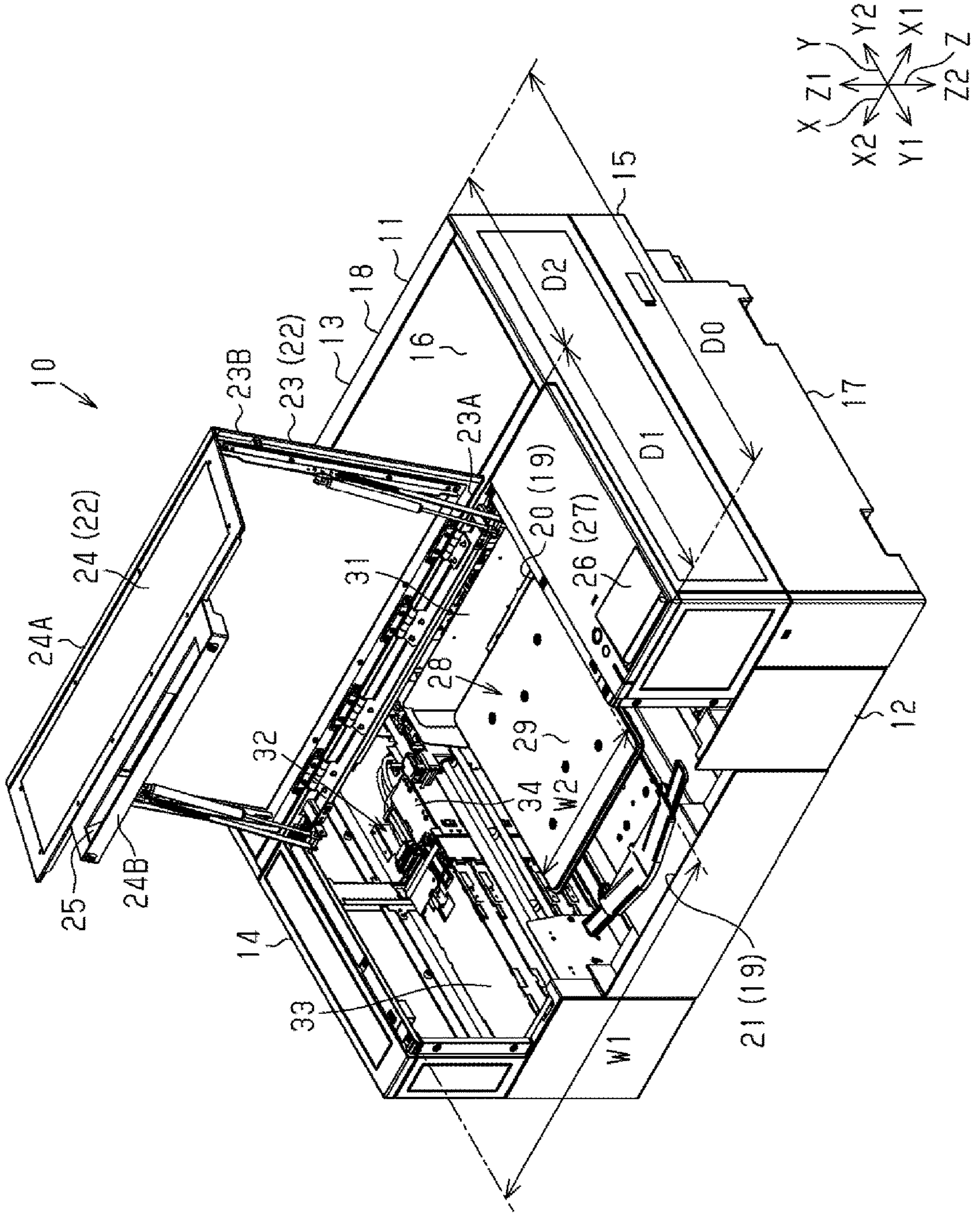
FIG. 2 is a perspective view illustrating the printing apparatus.
Figure 3:
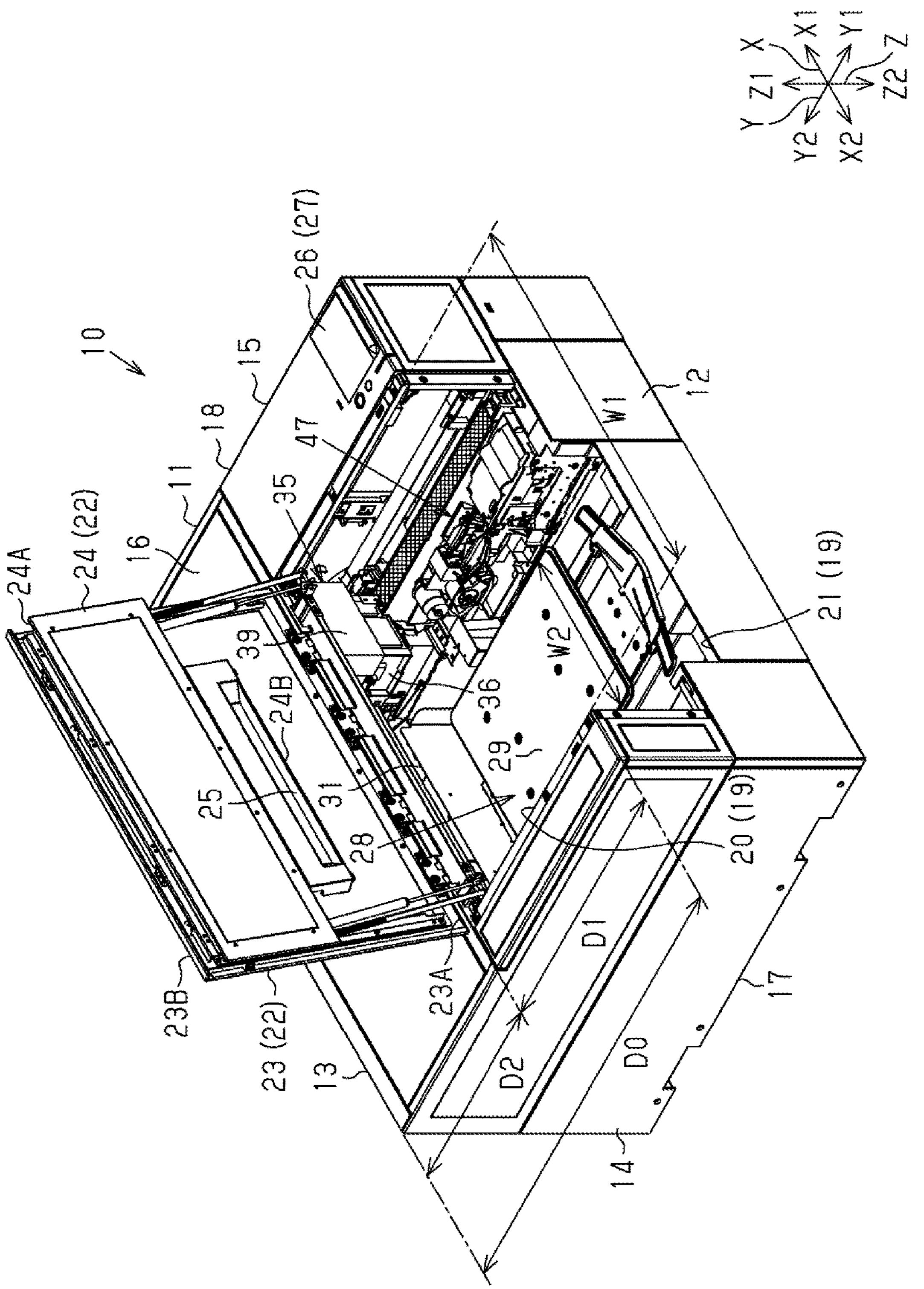
FIG. 3 is a perspective view illustrating the printing apparatus.

As illustrated in FIG. 2 and FIG. 3, the housing 11 is configured to accommodate various members included in the printing apparatus 10. In particular, the housing 11 accommodates a medium support unit 28, a liquid supply unit 32, a printing unit 35, and a maintenance unit 47, which are described later.

The housing 11 includes a housing frame 18. The housing frame 18 constitutes an exterior of the housing 11. The housing frame 18 includes an opening 19. In other words, the housing 11 includes the opening 19. The opening 19 is configured to expose the various members accommodated in the housing 11. In particular, the opening 19 is configured to expose a support surface 29 of the medium support unit 28, which is described later.

The opening 19 includes a first opening 20 and a second opening 21. The first opening 20 is provided at the top surface 16. The second opening 21 is provided at the front surface 12. The first opening 20 and the second opening 21 are provided so as to be continuous with each other. In other words, the opening 19 is provided across the top surface 16 and the front surface 12.

Figure 4:
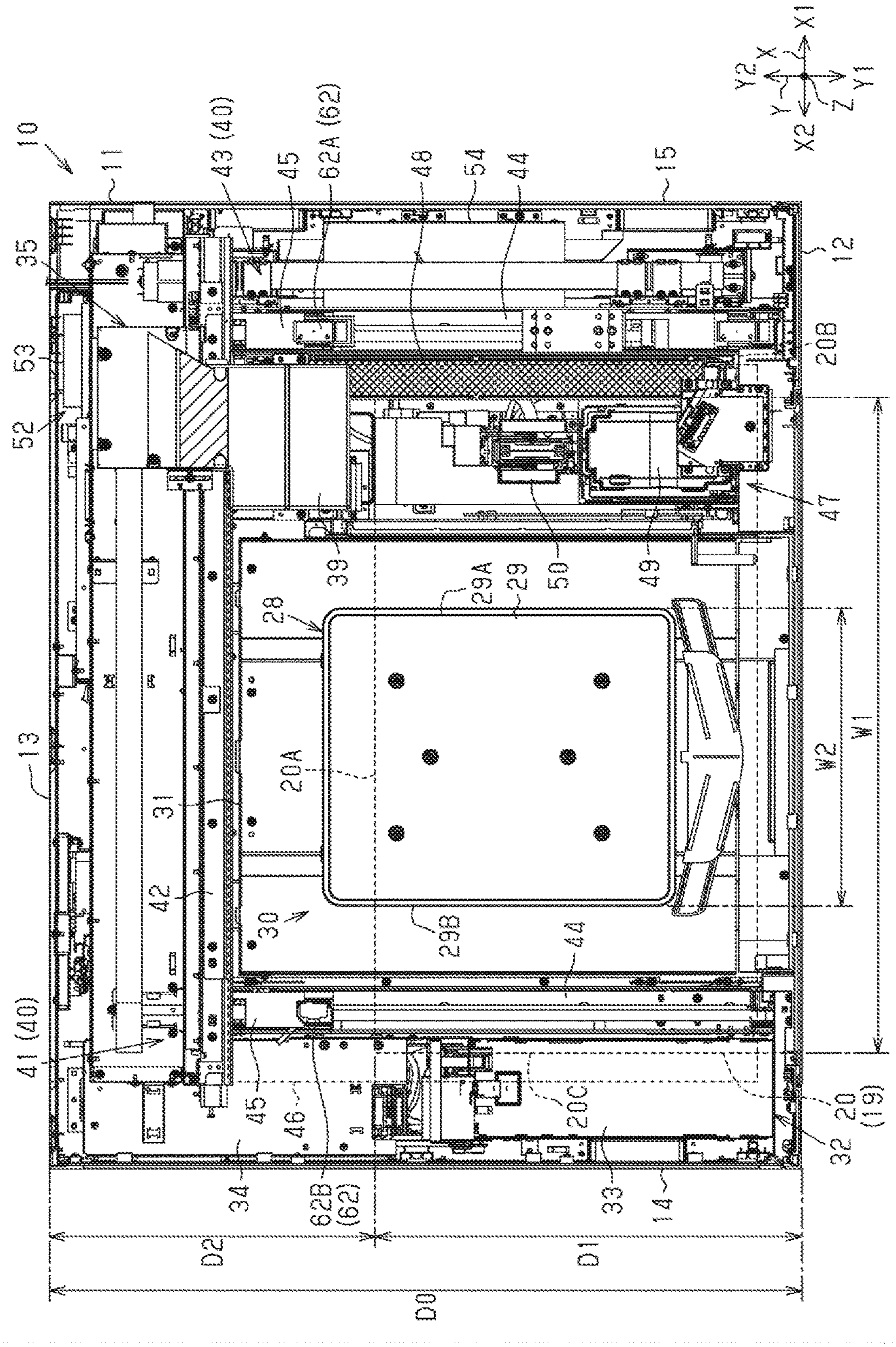
FIG. 4 is a top surface view illustrating the printing apparatus.

As illustrated in FIG. 4, in plan view, the first opening 20 is open between the front surface 12 and a first position 20A in the front-rear direction Y. The first position 20A is a position separated from the front surface 12 to the rear side Y2 by a first distance D1. The first position 20A is a position separated from the back surface 13 by a second distance D2. The first distance D1 is longer than the second distance D2. In other words, the first position 20A is closer to the back surface 13 than to the front surface 12 in the front-rear direction Y. When a distance between the front surface 12 and the back surface 13 in the front-rear direction Y is denoted by D0, the first distance D1 is longer than half of the distance D0.

In plan view, the first opening 20 is open between a second position 20B and a third position 20C in the width direction X. In plan view, the first opening 20 is open over a first width W1 in the width direction X. The first width W1 is longer than a second width W2 of the support surface 29. In this way, when viewed from the upper side Z1, the first opening 20 has a rectangular shape longer than the support surface 29 in the width direction X.

In particular, when viewed from the upper side Z1, the second position 20B is located further to the first width direction X1 side than a first side end 29A of the support surface 29. The first side end 29A is an end of the support surface 29 in the first width direction X1. When viewed from the upper side Z1, the third position 20C is located further to the second width direction X2 side than a second side end 29B of the support surface 29. The second side end 29B is an end of the support surface 29 in the second width direction X2. As described above, when viewed from the upper side Z1, the first opening 20 is open to positions on the outside of the first side end 29A and the second side end 29B in the width direction X.

As illustrated in FIG. 2 and FIG. 3, the housing 11 includes an opening/closing cover 22. The opening/closing cover 22 is capable of opening and closing the opening 19. The opening/closing cover 22 may be constituted by a sheet metal to secure rigidity. The opening/closing cover 22 includes a first opening/closing cover 23. The first opening/closing cover 23 has a flat plate shape. The first opening/closing cover 23 is capable of opening and closing the first opening 20.

The opening/closing cover 22 includes a second opening/closing cover 24. The second opening/closing cover 24 has a flat plate shape. The second opening/closing cover 24 is capable of opening and closing the second opening 21. The second opening/closing cover 24 includes a grip portion 25. The grip portion 25 can be gripped by the user. The grip portion 25 is provided on a second end 24B of the second opening/closing cover 24 to be described later.

The printing apparatus 10 includes a display unit 26 and an operation unit 27. The display unit 26 is configured to display information. The operation unit 27 is configured to be operable by the user. The display unit 26 and the operation unit 27 may be integrally configured as a touch panel, or may be separately configured. The display unit 26 and the operation unit 27 are provided on the top surface 16, but are not limited thereto.

Medium Support Unit 28

Figure 5:
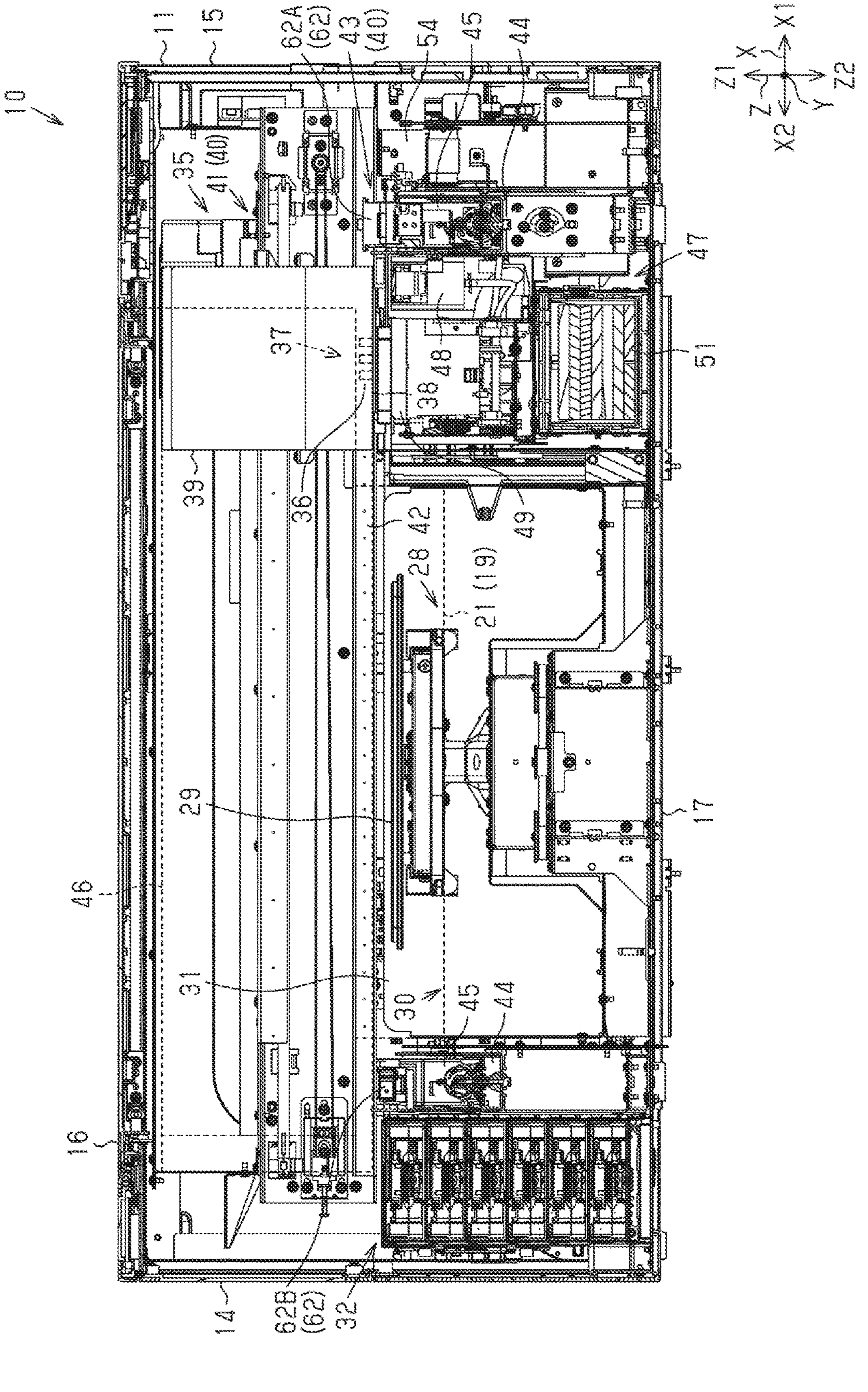
FIG. 5 is a front surface view illustrating the printing apparatus.

As illustrated in FIG. 4 and FIG. 5, the printing apparatus 10 includes the medium support unit 28. The medium support unit 28 is configured to support the medium. The medium support unit 28 includes the support surface 29. The support surface 29 is a surface facing the upper side Z1. The support surface 29 is configured to support the medium. In particular, the support surface 29 is the surface that supports at least a printing region of the medium.

The medium support unit 28 is configured not to move in the horizontal direction parallel to the support surface 29. In other words, the support surface 29 is configured not to move in the horizontal direction. The medium support unit 28 is capable of adjusting the position of the support surface 29 in the vertical direction Z.

The printing apparatus 10 includes a medium accommodation unit 30. The medium accommodation unit 30 is accommodated in the housing 11. The medium accommodation unit 30 is provided in at least the width direction X of the support surface 29, and may also be provided in the front-rear direction Y. When a partial region of the medium is supported by the support surface 29, the medium accommodation unit 30 is capable of accommodating a partial region of the medium that is not supported by the support surface 29.

In particular, the medium accommodation unit 30 includes an accommodation tray 31. The medium accommodation unit 30 includes regions partitioned by the accommodation tray 31. The accommodation tray 31 may define the medium accommodation unit 30 at least on the rear side Y2 of the support surface 29.

Liquid Supply Unit 32

The printing apparatus 10 includes the liquid supply unit 32. The liquid supply unit 32 is provided further in the second width direction X2 than the medium support unit 28 and the medium accommodation unit 30. The liquid supply unit 32 may be provided along an inner wall surface of the left side surface 14. The liquid supply unit 32 is configured to supply the liquid to a head 36, which is described later.

The liquid supply unit 32 includes a liquid storage unit 33 and a liquid supply driving unit 34. The liquid storage unit 33 is configured to store the liquid supplied to the head 36. The liquid storage unit 33 may be a detachable cartridge, or may be a tank that can be replenished with the liquid. The top surface of the liquid storage unit 33 may be a flat surface.

The liquid supply driving unit 34 is driven to supply the liquid stored in the liquid storage unit 33 to the head 36. The liquid supply driving unit 34 may include a liquid supply pump. The top surface of the liquid supply driving unit 34 may be a flat surface.

Printing Unit 35

The printing apparatus 10 includes the printing unit 35. The printing unit 35 is configured to perform printing on the medium. In particular, the printing unit 35 is configured to perform printing on the medium supported by the support surface 29.

The printing unit 35 includes the head 36. The head 36 is capable of ejecting the liquid onto the medium supported by the support surface 29. The head 36 includes a plurality of nozzles 37 and a nozzle surface 38. The nozzle surface 38 is a surface facing the lower side Z2. The nozzle surface 38 is a surface at which each of the plurality of nozzles 37 opens. Each of the plurality of nozzles 37 is capable of ejecting the liquid.

The printing unit 35 includes a carriage 39. The carriage 39 is configured to support the head 36. The head 36 is configured as a serial type. In the serial type, printing is performed while the head 36 moves in the width direction X.

The printing unit 35 includes a moving unit 40. The moving unit 40 is configured to move the carriage 39. In other words, the moving unit 40 is configured to move the head 36. The moving unit 40 is configured to move the head 36 in the horizontal direction. Specifically, the moving unit 40 is configured to move the head 36 in the width direction X and the front-rear direction Y.

The moving unit 40 includes a first moving unit 41. The first moving unit 41 is configured to move the carriage 39 in the width direction X. In other words, the first moving unit 41 is configured to move the head 36 in the width direction X.

The first moving unit 41 includes a first guide portion 42. The first guide portion 42 is configured to extend in the width direction X over the support surface 29. The first guide portion 42 guides the carriage 39 so as to be movable along the width direction X.

The moving unit 40 includes a second moving unit 43. The second moving unit 43 is configured to support the first moving unit 41. The second moving unit 43 is configured to move the first moving unit 41 in the front-rear direction Y. In other words, the second moving unit 43 is configured to move the head 36 in the front-rear direction Y.

In other words, the second moving unit 43 is configured to move an interference detection unit 62 in the front-rear direction Y. In other words, the second moving unit 43 is configured to move the interference detection unit 62, which is described later, in the front-rear direction Y together with the head 36.

The second moving unit 43 includes a pair of second guide portions 44. The pair of second guide portions 44 are provided in the first width direction X1 and the second width direction X2 of the medium support unit 28, with the medium support unit 28 interposed therebetween. Each of the pair of second guide portions 44 is configured to extend in the front-rear direction Y.

The second moving unit 43 includes a pair of support portions 45. The pair of support portions 45 are provided in the first width direction X1 and the second width direction X2 of the medium support unit 28, with the medium support unit 28 interposed therebetween. Each of the pair of support portions 45 is configured to support the first moving unit 41. The pair of support portions 45 are movable in the front-rear direction Y along the corresponding pair of second guide portions 44. In this manner, the moving unit 40 carries the head 36, and is movable in the horizontal direction over the medium support unit 28. The moving unit 40 is configured in a gate shape in a front view.

The printing apparatus 10 includes the interference detection unit 62. The interference detection unit 62 detects presence or absence of an interference object that may interfere with the head 36 on the lower side Z2 that is slightly lower than the nozzle surface 38 of the head 36. In other words, the interference detection unit 62 is configured to detect interference with respect to the head 36. The interference detection unit 62 may include a light projecting portion 62A and a photoreceptor portion 62B. The light projecting portion 62A and the photoreceptor portion 62B may be provided at the pair of support portions 45, respectively.

The interference detection unit 62 is located on the front side Y1 with respect to the head 36. Thus, the interference detection unit 62 is moved by the second moving unit 43 together with the head 36 in the front side Y1, and hence is capable of detecting interference with respect to the head 36 before an interference object actually interferes with the head 36.

The moving unit 40 is capable of moving the head 36 within a movement range 46. The movement range 46 of the head 36 includes a facing position and retracted positions. The facing position is a position at which the nozzle surface 38 faces the support surface 29. The retracted positions are positions at which the nozzle surface 38 does not face the support surface 29. The retracted positions include a standby position. The standby position is a position at which the head 36 is arranged when printing is not performed. The standby position is an initial position before a print command is received. The standby position may be located on the first width direction X1 side and the rear side Y2 side in the movement range 46. Further, the retracted positions include a maintenance position. The maintenance position is a position at which the nozzle surface 38 faces the maintenance unit 47, which is described later. In other words, the movement range 46 of the head 36 includes the maintenance position.

Maintenance Unit 47

The printing apparatus 10 includes the maintenance unit 47. The maintenance unit 47 is provided further in the first width direction X1 in than the medium support unit 28 and the medium accommodation unit 30. The maintenance unit 47 is arranged at a position that does not overlap with the medium support unit 28 and the medium accommodation unit 30 in the vertical direction Z. The maintenance unit 47 is configured to perform maintenance of the head 36.

As illustrated in FIG. 4, the maintenance unit 47 includes a flushing portion 48. The flushing portion 48 is configured to receive the liquid ejected from the head 36. The flushing portion 48 is configured to extend in the front-rear direction Y. However, the flushing portion 48 may be movable in the front-rear direction Y to face the nozzle surface 38. The flushing portion 48 is arranged at a position that does not overlap with the medium support unit 28 and the medium accommodation unit 30 in the vertical direction Z.

The maintenance unit 47 includes a wiping portion 49. The wiping portion 49 can wipe the nozzle surface 38. The wiping portion 49 is arranged at a position that does not overlap with the medium support unit 28 and the medium accommodation unit 30 in the vertical direction Z.

The maintenance unit 47 includes a suction portion 50. The suction portion 50 is configured to suck the liquid from the head 36. The suction portion 50 may include a suction pump that sucks the liquid from the head 36. The suction portion 50 is arranged at a position that does not overlap with the medium support unit 28 and the medium accommodation unit 30 in the vertical direction Z.

As illustrated in FIG. 5, the maintenance unit 47 includes a waste liquid tank 51. The waste liquid tank 51 is configured to store the liquid received by the flushing portion 48. The waste liquid tank 51 is configured to store the liquid sucked by the suction portion 50. The waste liquid tank 51 is arranged at a position that does not overlap with the medium support unit 28 and the medium accommodation unit 30 in the vertical direction Z. The waste liquid tank 51 is arranged at a position overlapping with the flushing portion 48 in the vertical direction Z. The waste liquid tank 51 is arranged at a position overlapping with the wiping portion 49 in the vertical direction Z. The waste liquid tank 51 is arranged at a position overlapping with the suction portion 50 in the vertical direction Z.

Control Board 52 and Power Supply Unit 54

As illustrated in FIG. 4, the printing apparatus 10 includes a control board 52. The control board 52 is accommodated in the housing 11. The control board 52 may be provided along the inner wall surface of the back surface 13. The control board 52 is a board on which various electronic components for controlling the printing apparatus 10 are mounted.

The control board 52 includes a control unit 53. The control unit 53 controls the printing apparatus 10. The control unit 53 controls various operations performed by the printing apparatus 10. The control unit 53 may be configured as a circuit including α: one or more processors that perform various processes according to a computer program, β: one or more dedicated hardware circuits that perform at least some of the various processes, or γ: a combination thereof. The hardware circuit is, for example, an application-specific integrated circuit. A processor includes a CPU and a memory such as a RAM or a ROM which stores program codes or instructions configured to cause the CPU to perform processes. The memory, that is, a computer-readable medium, includes any readable medium that can be accessed by a general purpose or special purpose computer.

The printing apparatus 10 includes a power supply unit 54. The power supply unit 54 is accommodated in the housing 11. The power supply unit 54 may be provided along the inner wall surface of the right side surface 15. The power supply unit 54 is configured to supply power to the printing apparatus 10.

Electrical Configuration of Printing Apparatus 10

Figure 6:
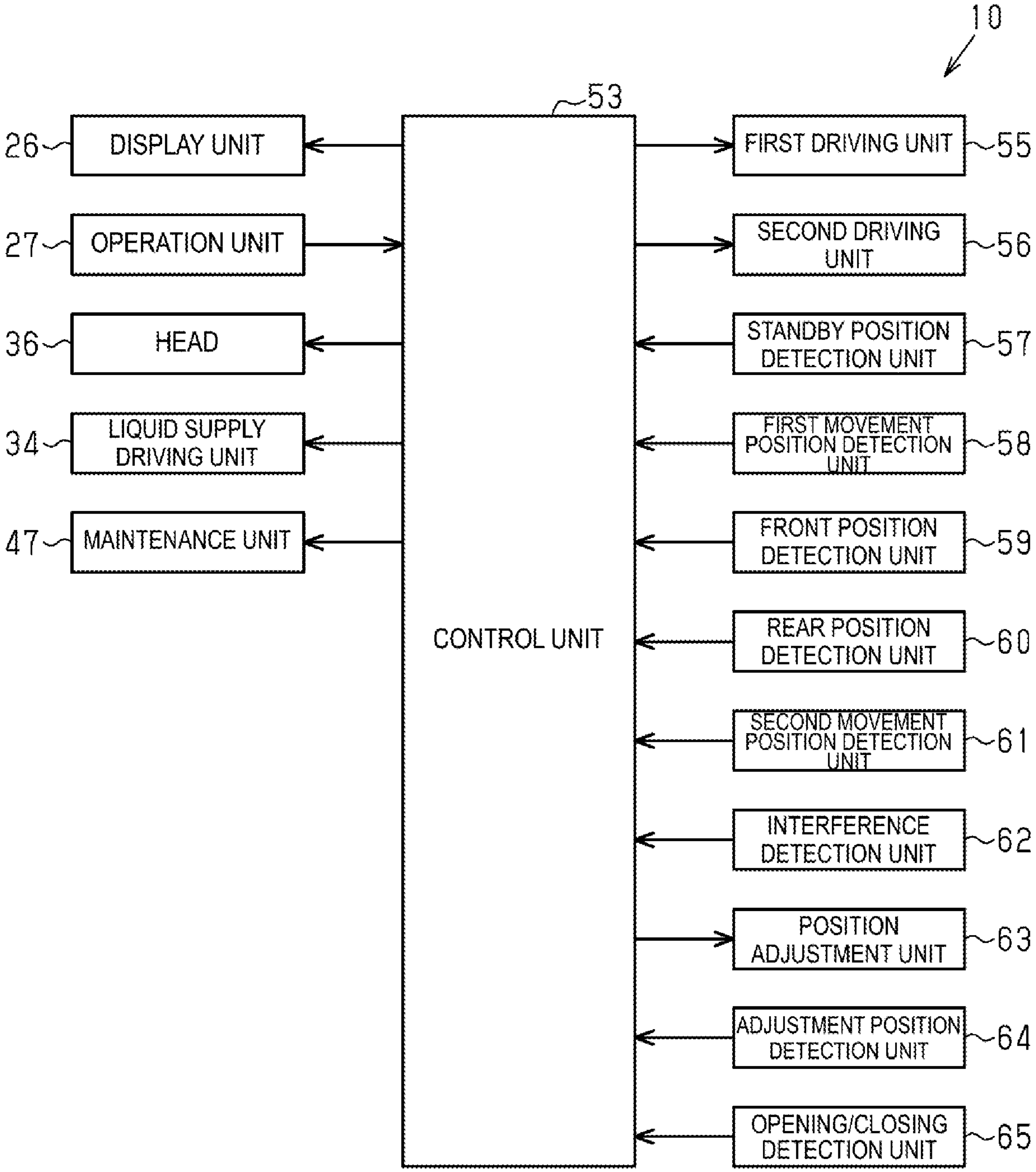
FIG. 6 is a block diagram illustrating an electrical configuration of the printing apparatus.

Next, with reference to FIG. 6, an electrical configuration of the printing apparatus 10 is described.

As illustrated in FIG. 6, the printing apparatus 10 includes a first driving unit 55. The first driving unit 55 is a driving source that moves the carriage 39 along the width direction X. The first driving unit 55 may be provided at the first moving unit 41.

The printing apparatus 10 includes a second driving unit 56. The second driving unit 56 is a driving source that moves the first moving unit 41 along the front-rear direction Y. The second driving unit 56 may be provided at the second moving unit 43.

The printing apparatus 10 includes a standby position detection unit 57. The standby position detection unit 57 is capable of detecting that the head 36 is arranged at the standby position. The standby position detection unit 57 may be provided at the first moving unit 41.

The printing apparatus 10 includes a first movement position detection unit 58. The first movement position detection unit 58 is capable of detecting the position in the width direction X at which the head 36 moving in the width direction X is arranged. The first movement position detection unit 58 may be provided at the first moving unit 41.

The printing apparatus 10 includes a front position detection unit 59. The front position detection unit 59 is capable of detecting that the head 36 is arranged at a front-most position. The front position detection unit 59 may be provided at the second moving unit 43.

The printing apparatus 10 includes a rear position detection unit 60. The rear position detection unit 60 is capable of detecting that the head 36 is arranged at a rear-most position. The rear position detection unit 60 may be provided at the second moving unit 43.

The printing apparatus 10 includes a second movement position detection unit 61. The second movement position detection unit 61 is capable of detecting a position in the front-rear direction Y at which the head 36 is arranged. The second movement position detection unit 61 may be provided at the second moving unit 43. In other words, the second movement position detection unit 61 detects the position of the head 36 in the front-rear direction Y. Further, it may be understood that the second movement position detection unit 61 detects the position of the interference detection unit 62 in the front-rear direction Y. The second movement position detection unit 61 corresponds to an example of a position detection unit.

The printing apparatus 10 includes a position adjustment unit 63. The position adjustment unit 63 is configured to adjust the position of the support surface 29 in the vertical direction Z. In other words, the position adjustment unit 63 is configured to adjust an interval between the head 36 and the support surface 29 in the vertical direction Z. The position adjustment unit 63 may be provided at the medium support unit 28. The position adjustment unit 63 may be configured to adjust the position of the accommodation tray 31 in the vertical direction Z.

The printing apparatus 10 includes an adjustment position detection unit 64. The adjustment position detection unit 64 is capable of detecting the position of the support surface 29 in the vertical direction Z. In other words, the adjustment position detection unit 64 is configured to detect an interval between the support surface 29 and the nozzle surface 38. The adjustment position detection unit 64 may be provided at the medium support unit 28.

The printing apparatus 10 includes an opening/closing detection unit 65. The opening/closing detection unit 65 is capable of detecting an opening/closing state of the first opening/closing cover 23. In other words, the opening/closing detection unit 65 is capable of detecting the opening/closing state of the opening/closing cover 22. The opening/closing detection unit 65 is provided on the inner wall surface of the top surface 16, but is not limited thereto.

The control unit 53 is coupled to the display unit 26, the head 36, the first driving unit 55, the second driving unit 56, the position adjustment unit 63, the liquid supply driving unit 34, and the maintenance unit 47. The control unit 53 causes the display unit 26 to display various types of images. The control unit 53 supplies drive signals to control the head 36, the first driving unit 55, the second driving unit 56, the position adjustment unit 63, the liquid supply driving unit 34, and the maintenance unit 47. In particular, the control unit 53 controls the first moving unit 41 by controlling the first driving unit 55, and controls the second moving unit 43 by controlling the second driving unit 56.

The control unit 53 is coupled to the operation unit 27, the standby position detection unit 57, the first movement position detection unit 58, the front position detection unit 59, the rear position detection unit 60, the second movement position detection unit 61, the interference detection unit 62, the adjustment position detection unit 64, and the opening/closing detection unit 65. The control unit 53 is capable of receiving operation signals from the operation unit 27. The control unit 53 is capable of receiving detection signals from the standby position detection unit 57, the first movement position detection unit 58, the front position detection unit 59, the rear position detection unit 60, the second movement position detection unit 61, the interference detection unit 62, the adjustment position detection unit 64, and the opening/closing detection unit 65.

The control unit 53 performs various types of control, based on the operation signals and the detection signals. As a specific example, the control unit 53 may stop the printing when the opening/closing detection unit 65 detects that the opening/closing cover 22 is opened while printing is being performed.

Printing Control Processing

Figure 7:
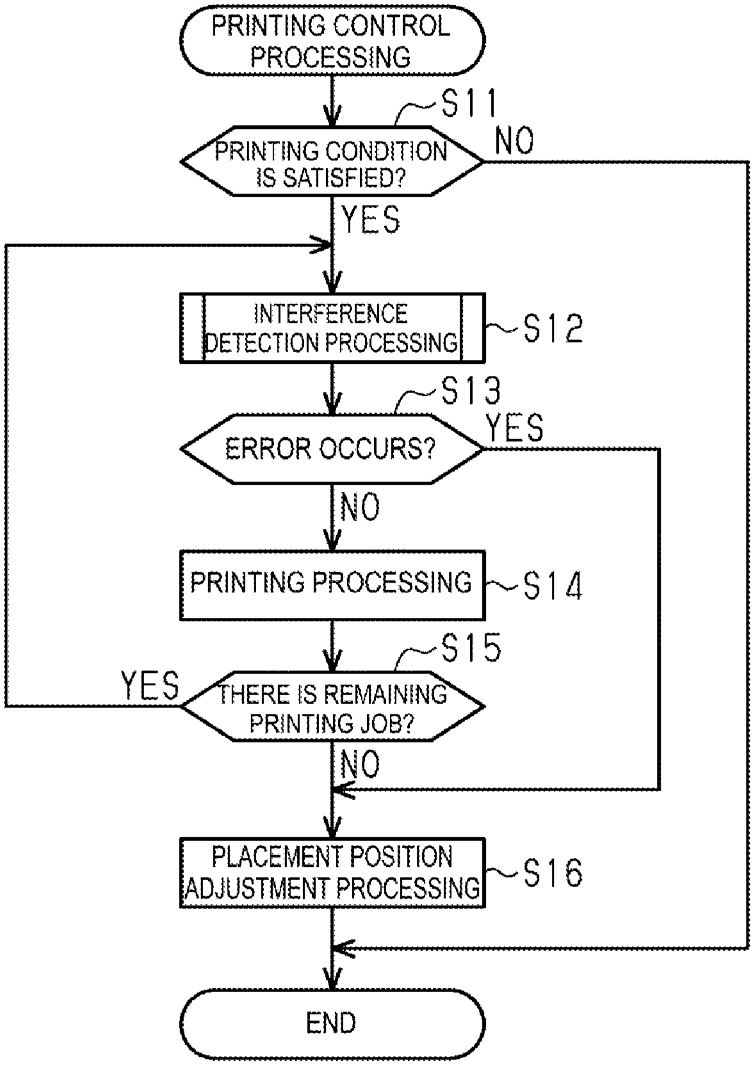
FIG. 7 is a flowchart illustrating printing control processing.

Here, with reference to FIG. 7, printing control processing is described. The printing control processing is processing executed by the control unit 53 at a predetermined period. Here, the order of the processing can be changed as desired insofar as it does not depart from the purpose of the processing.

As illustrated in FIG. 7, in step S11, the control unit 53 determines whether a printing condition is satisfied. In the processing, the control unit 53 determines that the print condition is satisfied by receiving a print command from the user when printing is not being performed. When the control unit 53 determines that the print condition is not satisfied, the control unit 53 terminates the printing control processing. On the other hand, when the control unit 53 determines that the printing condition is satisfied, the control unit 53 shifts the processing to step S12.

In step S12, the control unit 53 executes interference detection processing. Although details thereof are described later, in the processing, the control unit 53 moves interference detection unit 62 together with the head 36 in the front side Y1, and controls the position adjustment unit 63 so that the interval between the head 36 and the support surface 29 is adjusted, based on a detection result by the interference detection unit 62. When the processing is completed, the control unit 53 shifts the processing to step S13.

In step S13, the control unit 53 determines whether an error relating to the interference detection occur. The error relating to the interference detection may include an interference error. The interference error is an error when interference with respect to the head 36 is detected based on the detection result by the interference detection unit 62. The error relating to the interference detection may include a non-placement error. The non-placement error is an error when no placement of the medium on the support surface 29 is detected based on the detection result by the interference detection unit 62.

When the control unit 53 determines that the error relating to the interference detection occurs, the control unit 53 terminates the printing control processing after executing error processing. The control unit 53 causes the display unit 26 to display an error image relating to an error in the error processing. In the error processing, the control unit 53 may control the first driving unit 55 and the second driving unit 56 to move the head 36 to the standby position, but is not limited thereto. On the other hand, when the control unit 53 determines that the error relating to the interference detection does not occur, the control unit 53 shifts the processing to step S14.

In step S14, the control unit 53 executes printing processing. In the processing, the control unit 53 controls the first driving unit 55 so that the first moving unit 41 moves the head 36 in the width direction X, and also controls the head 36 to perform printing on the medium, based on image data included in the print command. With this, the control unit 53 performs printing by one pass. The control unit 53 controls the second driving unit 56 to move the head 36 to the rear side Y2 by a predetermined distance. In this manner, the control unit 53 performs printing for each pass by moving the head 36 in the width direction X and to the rear side Y2. Further, the control unit 53 controls the head 36 to move the head 36 to the rear side Y2 and in the width direction X until the head 36 reaches the rear-most position and to perform printing on the medium. When the processing is completed, the control unit 53 shifts the processing to step S15.

In step S15, the control unit 53 determines whether there is a remaining printing job for a subsequent layer, based on the print command from the user. For example, printing on a subsequent layer is performed after white base printing is performed on a medium as printing on a first layer. As printing on the first layer, a single-colored or multi-colored pattern or the like may be printed instead of white base printing. As printing on the subsequent layer, a single-colored or multi-colored pattern or the like may be printed, or white base printing may be performed again. Printing on a subsequent layer may be performed at a position overlapping with printing on the first layer or printing on another subsequent layer or a position not overlapping therewith. When the control unit 53 determines that there is a remaining printing job, the control unit 53 shifts the processing to step S12 again. On the other hand, when the control unit 53 determines that there is no remaining printing job, the control unit 53 shifts the processing to step S16. In this manner, the control unit 53 is capable of executing steps S11 to S14 until the control unit 53 determines that there is no remaining printing job.

In step S16, the control unit 53 executes placement position adjustment processing. In the processing, the control unit 53 controls the position adjustment unit 63 to move the support surface 29 to the placement position, by moving the support surface 29 to the upper side Z1. When the processing is completed, the control unit 53 terminates the printing control processing.

In this way, when a driving condition is satisfied, the control unit 53 drives the position adjustment unit 63 so that the support surface 29 is located at the placement position. The driving condition is satisfied when printing is not being performed, and the head 36 is arranged at the retracted position. With this, when the head 36 is arranged at the retracted position while printing is not being performed, the position adjustment unit 63 is capable of moving the support surface 29 to a position higher than the nozzle surface 38 in the vertical direction Z. In other words, when the head 36 is arranged at the retracted position while printing is not being performed, the position adjustment unit 63 is capable of moving the support surface 29 from being outside the movement range to being within the movement range.

Further, the control unit 53 controls the head 36 and the maintenance unit 47 to perform flushing at a predetermined control period during execution of the printing control processing. In particular, the control unit 53 controls the head 36 and the maintenance unit 47 to perform flushing at a predetermined control period at least during execution of the interference detection processing. The predetermined control period may be several tens of seconds, for example.

Interference Detection Processing

Figure 8:
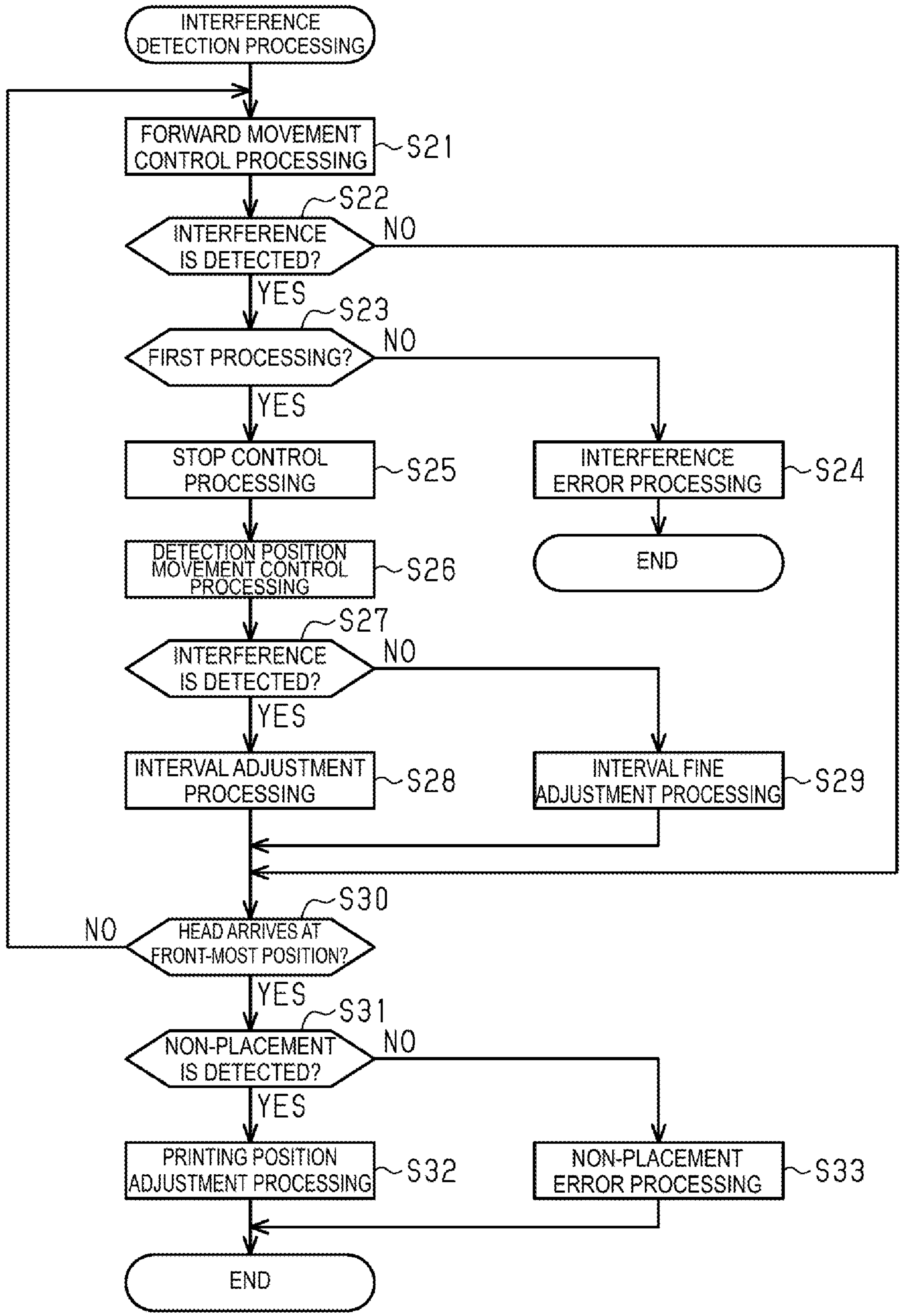
FIG. 8 is a flowchart illustrating interference detection processing.

Next, with reference to FIG. 8, the interference detection processing is described. The interference detection processing is processing invoked by the control unit 53 in step S12.

As illustrated in FIG. 8, in step S21, the control unit 53 executes forward movement control processing. In the processing, the control unit 53 controls the second driving unit 56 to move the head 36 to the front side Y1. Subsequently to the processing, the processing is completed, the control unit 53 shifts the processing to step S22.

In step S22, the control unit 53 determines whether interference with respect to the head 36 is detected, based on the detection signal from the interference detection unit 62. When the control unit 53 determines that interference with respect to the head 36 is not detected, the control unit 53 shifts the processing to step S30 without executing steps S23 to S29. On the other hand, when the control unit 53 determines that interference with respect to the head 36 is detected, the control unit 53 shifts the processing to step S23.

In step S23, the control unit 53 determines whether the interference detection processing that is currently being executed is initial processing. Before printing on the first layer is performed on the medium, the control unit 53 determines that the interference detection processing is the initial processing. Before printing on a subsequent layer is performed on the medium, the control unit 53 determines that the interference detection processing is not the initial processing. When the control unit 53 determines that the interference detection processing that is currently being executed is not the initial processing, the control unit 53 shifts the processing to step S24. On the other hand, when the control unit 53 determines that the interference detection processing that is currently being executed is the initial processing, the control unit 53 shifts the processing to step S25.

In step S24, the control unit 53 performs interference error processing. In the processing, the control unit 53 determines that the interference error occurs. Specifically, when interference with respect to the head 36 is detected in second or subsequent interference detection processing, it is assumed that an interference object other than the medium placed on the support surface 29 is detected. Thus, the control unit 53 determines that the interference error occurs. When the processing is completed, the control unit 53 terminates the interference detection processing. With this, in step S13 in FIG. 7, the control unit 53 determines that the interference error occurs.

In step S25, the control unit 53 executes stop control processing. In the processing, the control unit 53 controls the second driving unit 56 that moves the head 36 to the front side Y1 to stop. When the second driving unit 56 is stopped, the second moving unit 43 moves for a braking distance, and then is stopped. The braking distance corresponds to a distance from a detection position at which interference is detected to a stop position at which stoppage is actually performed. The braking distance differs depending on a moving speed of the head 36 and the interference detection unit 62 and characteristics of the second driving unit 56. In this manner, when the interference detection unit 62 detects interference with respect to the head 36 as a result of moving the interference detection unit 62 to the front side Y1 in the front-rear direction Y, the control unit 53 performs stop control for stopping the interference detection unit 62 at the stop position. When the processing is completed, the control unit 53 shifts the processing to step S26.

In step S26, the control unit 53 executes detection position movement control processing. In the processing, the control unit 53 controls the second driving unit 56 so that the head 36 is moved by the second moving unit 43 to the rear side Y2 by the braking distance and then is stopped. In this manner, when the interference detection unit 62 detects interference with respect to the head 36 as a result of moving the interference detection unit 62 to the front side Y1 in the front-rear direction Y, the control unit 53 performs the stop control, and then performs control for moving the interference detection unit 62 to the detection position to the rear side Y2. In other words, the control unit 53 specifies the detection position at which the interference detection unit 62 detects interference as a position at which the interference detection unit 62 is returned to the rear side Y2. The detection position described above corresponds to an example of a predetermined position. When the processing is completed, the control unit 53 shifts the processing to step S27.

In step S27, the control unit 53 determines whether interference with respect to the head 36 is detected, based on the detection signal from the interference detection unit 62. In other words, when the control unit 53 determines that interference with respect to the head 36 is detected in step S22, the control unit 53 determines again whether interference with respect to the head 36 is detected from the stop position to the detection position. When the control unit 53 determines that interference with respect to the head 36 is detected, the control unit 53 shifts the processing to step S28. On the other hand, when the control unit 53 determines that interference with respect to the head 36 is not detected, the control unit 53 shifts the processing to step S29.

In step S28, the control unit 53 performs interval adjustment processing. In the processing, the control unit 53 controls the position adjustment unit 63 to move the support surface 29 to the lower side Z2, to a boundary position beyond which interference is not detected. Further, the control unit 53 controls the position adjustment unit 63 to move the support surface 29 from the boundary position beyond which interference is not detected to the lower side Z2 by a fine adjustment interval and then stop the support surface 29. The fine adjustment interval is larger than an interval required for moving the support surface 29 from a position at which the interference detection unit 62 does not detect interference to a position at which the support surface 29 is actually stoppled. The fine adjustment interval may be an interval that is finely adjusted so as to reduce frequency at which the interference detection unit 62 detects interference when the interference detection unit 62 is moved to the front side Y1 again. In this manner, the control unit 53 moves the support surface 29 to the lower side Z2 so that the interval between the head 36 and the support surface 29 is further increased in addition by the fine adjustment interval from the boundary position beyond which interference is not detected.

In this manner, at the detection position, the control unit 53 performs adjustment control for causing the position adjustment unit 63 to perform adjustment so that the interval between the head 36 and the support surface 29 is further increased by the fine adjustment interval from the boundary position beyond which interference is not detected. In other words, at the detection position, the control unit 53 performs the adjustment control for causing the position adjustment unit 63 to perform adjustment so that the interval between the head 36 and the support surface 29 is increased beyond the boundary position beyond which interference is not detected.

Further, the control unit 53 stores the fine adjustment interval in the memory. In particular, in a state in which the fine adjustment interval is previously stored in the memory, when the interference detection unit 62 further detects interference to execute step S28, the control unit 53 stores the fine adjustment interval in the memory in an overwriting manner. With this, when step S28 is executed, the control unit 53 stores the latest fine adjustment interval. When the processing is completed, the control unit 53 shifts the processing to step S30.

In step S29, the control unit 53 performs interval fine adjustment processing. In the processing, the control unit 53 controls the position adjustment unit 63 to move the support surface 29 to the lower side Z2 by a fine adjustment interval and then stop the support surface 29. In this manner, even when the detection position does not detect interference, the control unit 53 moves the support surface 29 to the lower side Z2 so that the interval between the head 36 and the support surface 29 is increased in addition by the fine adjustment interval.

In this manner, even when interference is not detected at the detection position, the control unit 53 performs the adjustment control for causing the position adjustment unit 63 to perform adjustment so that the interval between the head 36 and the support surface 29 is increased by the fine adjustment interval.

Further, the control unit 53 stores the fine adjustment interval in the memory. In particular, in a state in which the fine adjustment interval is previously stored in the memory, when the interference detection unit 62 further detects interference to execute step S29, the control unit 53 further stores the fine adjustment interval additionally in the memory. With this, when step S29 is executed, the control unit 53 stores the accumulated fine adjustment interval. When the processing is completed, the control unit 53 shifts the processing to step S30.

In step S30, the control unit 53 determines whether the head 36 arrives at the front-most position, based on the detection signal from the front position detection unit 59. In other words, the control unit 53 moves the interference detection unit 62 together with the head 36 to the front side Y1 until the head 36 arrives at the front-most position from the rear-most position. With this, the control unit 53 determines whether detection processing for interference with respect to the head 36 is completed. When the control unit 53 determines that the head 36 does not arrive at the front-most position, the control unit 53 shifts the processing to step S21 again. On the other hand, when the control unit 53 determines that the head 36 arrives at the front-most position, the control unit 53 shifts the processing to step S31.

In this manner, the control unit 53 moves the interference detection unit 62 together with the head 36 to the front side Y1 until the head 36 arrives at the front-most side, and controls the position adjustment unit 63 so that interference with respect to the head 36 is not detected.

Control for moving the interference detection unit 62 to the front side Y1 in step S21 before the interference detection unit 62 detects interference in step S22 corresponds to an example of first moving control. When the interference detection unit 62 detects interference in step S22 as a result of performing the first movement control, control for stopping the interference detection unit 62 at the stop position in step S25 corresponds to an example of the stop control. Control for moving the interference detection unit 62 to the detection position to the rear side Y2 in step S26 corresponds to an example of second movement control. When the interference detection unit 62 detects interference in step 22, control for executing steps S25 and S26 and then moving the interference detection unit 62 again to the front side Y1 in step S21 corresponds to an example of the third movement control.

In this manner, when the interference detection unit 62 detects interference as a result of performing the first movement control, the control unit 53 performs the second movement control after performing the stop control, and performs the third movement control after performing the second movement control. Further, the control unit 53 performs the adjustment control for causing the position adjustment unit 63 to perform adjustment so that the interval between the head 36 and the support surface 29 is increased between the stop control and the third movement control. In particular, the control unit 53 performs the adjustment control after performing the second movement control, and performs the third movement control after performing the adjustment control.

In step S31, the control unit 53 determines whether the medium is not placed on the support surface 29. When the head 36 is located on the rear-most side, there is only a slight interval between the head 36 and the support surface 29. Thus, when the medium is placed on the support surface 29, it is detected that interference with respect to the head 36 occurs while the head 36 moves from the rear-most side to the front-most side. In this manner, when it is detected that interference with respect to the head 36 occurs in step S22 while the head 36 moves from the rear-most side to the front-most side, the control unit 53 determines that the medium is not placed on the support surface 29.

When the control unit 53 determines that the medium is placed on the support surface 29, the control unit 53 shifts the processing to step S32. On the other hand, when the control unit 53 determines that the medium is not placed on the support surface 29, the control unit 53 shifts the processing to step S33.

In step S32, the control unit 53 executes printing position adjustment processing. In the processing, the control unit 53 controls the position adjustment unit 63 to move the support surface 29 to the lower side Z2. In particular, the control unit 53 controls the position adjustment unit 63 to move the support surface 29 to the lower side Z2 by a difference between a prescribed interval and the fine adjustment interval stored in the memory. The prescribed interval is an interval that is prescribed as the printing position. The fine adjustment position is an interval that is finely adjusted in addition to the lower side Z2 in steps S28 and S29. In other words, the control unit 53 performs adjustment by the fine adjustment interval from the boundary position beyond which interference is not detected in steps S28 and S29. Thus, the control unit 53 controls the position adjustment unit 63 to move the support surface 29 to the lower side Z2 by the difference between the prescribed interval and the fine adjustment interval.

In this manner, the control unit 53 causes the position adjustment unit 63 to perform adjustment so that the interval between the head 36 and the support surface 29 is the prescribed interval, based on the difference between the prescribed interval and the fine adjustment interval, when detection of interference by the interference detection unit 62 is completed. In other words, when detection of interference by the interference detection unit 62 is completed as a result of moving the interference detection unit 62 to the front side Y1, the control unit 53 causes the position adjustment unit 63 to perform adjustment so that the interval between the head 36 and the support surface 29 is the prescribed interval. When the processing is completed, the control unit 53 terminates the interference detection processing.

In step S33, the control unit 53 executes non-placement error processing. In the processing, the control unit 53 determines that the non-placement error occurs. When the processing is completed, the control unit 53 terminates the interference detection processing. With this, in step S13 in FIG. 7, the control unit 53 determines that the non-placement error occurs.

Actions of First Exemplary Embodiment

Actions of the first exemplary embodiment are described.

In the printing apparatus 10, when the power source is turned on, the support surface 29 is arranged at the placement position in a state in which the head 36 is arranged at the standby position. With this, the support surface 29 is raised so as to be arranged within the movement range 46 of the head 36.

In the state in which the opening 19 is open and the support surface 29 is arranged at the placement position, the user can easily place the medium on the support surface 29 from the front side Y1. In this case, at least the printing region of the medium is supported by the support surface 29. Further, a partial region of the medium that is not supported by the support surface 29 is accommodated in the medium accommodation unit 30.

When the print command is input in the state in which the opening 19 is closed, the position adjustment unit 63 moves the support surface 29 to the lower side Z2 to the boundary position beyond which interference is not detected as the head 36 and the interference detection unit 62 move to the front side Y1. With this, the support surface 29 is arranged at the printing position.

Figure 9:
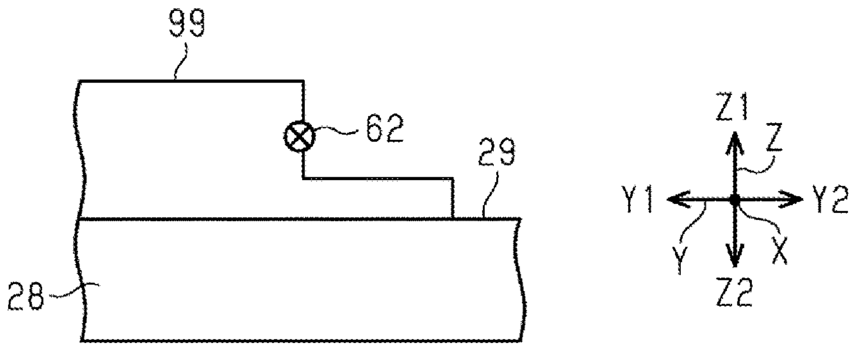
FIG. 9 is a schematic view illustrating an interference detection unit and a support surface.
Figure 10:
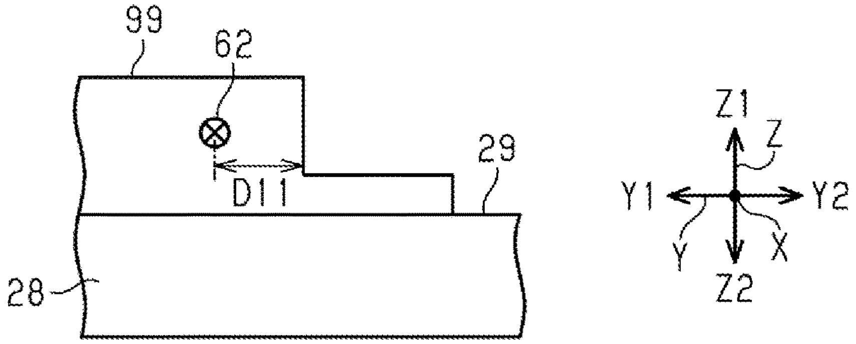
FIG. 10 is a schematic view illustrating the interference detection unit and the support surface.

Specifically, as illustrated in FIG. 9, in a state in which a medium 99 placed on the support surface 29 has irregularities thereon, the interference detection unit 62 detects interference with respect to the head 36 while moving to the front side Y1. In such a case, as illustrated in FIG. 10, the interference detection unit 62 stops at the stop position on the front side Y1 with respect to the detection position at which interference is detected. The stop position is located on the front side Y1 with respect to the detection position by the braking distance. In FIG. 10, the braking distance is denoted with the reference symbol D11.

Figure 11:
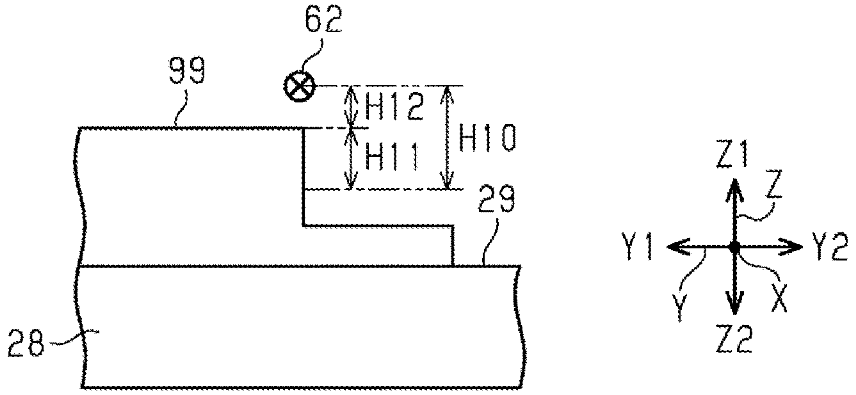
FIG. 11 is a schematic view illustrating the interference detection unit and the support surface.

Further, as illustrated in FIG. 11, when interference with respect to the head 36 is detected after the interference detection unit 62 moves from the stop position to the detection position to the rear side Y2, the support surface 29 moves to the lower side Z2 by a height H10. In particular, the support surface 29 moves to the lower side Z2 by a height H11 to the boundary position beyond which interference is not detected, and further moves to the lower side Z2 by the fine adjustment interval from the boundary position beyond which interference is not detected. In FIG. 11, the fine adjustment interval is denoted with the reference symbol H12.

On the other hand, when interference with respect to the head 36 is not detected after movement from the stop position to the detection position, the support surface 29 moves to the lower side Z2 by the fine adjustment interval. After that, the head 36 and the interference detection unit 62 start moving to the front side Y1.

With this, when the head 36 arrives at the front-most position, and detection of interference with respect to the head 36 is completed, the support surface 29 moves based on the fine adjustment interval so that the interval between the head 36 and the support surface 29 is the prescribed interval. With this, the support surface 29 is arranged at the printing position.

Subsequently, printing is performed in as the head 36 moves to the rear side Y2. With this, the printing unit 35 is capable of performing printing on the medium placed on the support surface 29 without the head 36 colliding with the support surface 29.

When printing is completed, the position adjustment unit 63 moves the support surface 29 from the printing position to the placement position in the state in which the head 36 is arranged at the standby position. With this, when printing is not being performed, the position adjustment unit 63 is capable of adjusting the position of the support surface 29 to the upper side Z1, to a position higher than when printing is being performed.

Effects of First Embodiment

Effects of the first exemplary embodiment are described.

(1-1) When the interference detection unit 62 detects interference as a result of moving the interference detection unit 62 to the front side Y1, the control unit 53 performs the stop control for stopping the interference detection unit 62 at the stop position. Further, after the control unit 53 moves the interference detection unit 62 from the stop position to the detection position to the rear side Y2, the control unit 53 moves the interference detection unit 62 to the front side Y1 again. The control unit 53 performs the adjustment control for performing adjustment so that the interval between the head 36 and the support surface 29 is increased, based on the detection result by the interference detection unit 62, between the stop control and the third movement control. Thus, the control unit 53 stops the interference detection unit 62 at the stop position, returns the interference detection unit 62 to the rear side Y2, and then moves the interference detection unit 62 to the front side Y1. During such an operation, the control unit 53 is capable of performing the adjustment control even when interference is detected. Thus, the operational efficiency associated with interference with respect to the head 36 can be improved.

(1-2) The control unit 53 specifies the detection position at which the interference detection unit 62 detects interference as the predetermined position. Thus, the control unit 53 stops the interference detection unit 62 at the stop position, returns the interference detection unit 62 to the detection position, and then moves the interference detection unit 62 to the front side Y1. During such an operation, the control unit 53 is capable of performing the adjustment control even when interference is detected. Thus, the operational efficiency associated with interference with respect to the head 36 can be improved.

(1-3) In particular, adjustment can be performed so that the interval between the head 36 and the support surface 29 is increased without returning the interference detection unit 62 to the standby position. Thus, the operational efficiency associated with interference with respect to the head 36 can be improved.

(1-4) the control unit 53 performs the adjustment control after performing the second movement control for returning the interference detection unit 62 from the stop position to the detection position. Thus, even when interference is detected as a result of moving the interference detection unit 62 to the front side Y1, the control unit 53 is capable of returning the interference detection unit 62 from the stop position to the rear side Y2 and then performing adjustment so that the interval between the head 36 and the support surface 29 is increased. With this, at the detection position on the rear side Y2 with respect to the stop position instead of the stop position, adjustment can be performed based on the detection result by the interference detection unit 62 so that the interval between the head 36 and the support surface 29 is increased. Thus, the operational efficiency associated with interference with respect to the head 36 can be improved.

(1-5) In particular, when interference with respect to the head 36 is detected, movement of the interference detection unit 62 cannot be stopped immediately. Thus, reliability of detection of interference is higher at the detection position at which interference with respect to the head 36 is detected than at the stop position at which the interference detection unit 62 stops. Thus, the detection accuracy of interference with respect to the head 36 can be improved.

(1-6) In a case in which the interval between the head 36 and the support surface 29 is increased, even when the interval between the head 36 and the support surface 29 is increased further beyond the boundary position beyond which the interference detection unit 62 does not detect interference, the control unit 53 does not return the interference detection unit 62 to the position at which interference is not detected. When the head 36 arrives at the front-most position as a result of moving the interference detection unit 62 together with the head 36 to the front side Y1, the control unit 53 completes detection of interference. Further, when detection of interference is completed, the control unit 53 performs adjustment to increase the interval between the head 36 and the support surface 29 so that the interval between the head 36 and the support surface 29 is the prescribed interval. Thus, with regard to the interval between the head 36 and the support surface 29, the interference detection unit 62 is not returned to the boundary position beyond which interference is not detected, which is different from movement of the interference detection unit 62 to the front-rear direction Y. In particular, the interval between the head 36 and the support surface 29 can be adjusted so that the interval between the head 36 and the support surface 29 is the prescribed interval, in consideration of the fact that the interference detection unit 62 is not returned when detection of interference is completed. Thus, the operational efficiency associated with interference with respect to the head 36 can be improved.

(1-7) When the head 36 arrives at the front-most position as a result of moving the interference detection unit 62 together with the head 36 to the front side Y1, the control unit 53 performs adjustment so that the interval between the head 36 and the support surface 29 is the prescribed interval, based on the difference between the prescribed interval and the fine adjustment interval. Thus, with regard to the interval between the head 36 and the support surface 29, the interference detection unit 62 is further moved by the fine adjustment interval from the boundary position beyond which interference is not detected, which is different from movement of the interference detection unit 62 to the front-rear direction Y. In particular, when detection of interference with respect to the head 36 is completed, the interval between the head 36 and the support surface 29 is adjusted so that the interval between the head 36 and the support surface 29 is the prescribed interval, based on the difference between the prescribed interval and the fine adjustment interval that is increased in addition. Thus, the operational efficiency associated with interference with respect to the head 36 can be improved.

(1-8) When interference with respect to the head 36 is detected at the detection position, the control unit 53 performs adjustment so that the interval between the head 36 and the support surface 29 is further increased in addition by the fine adjustment interval from the boundary position beyond which interference is not detected. Thus, the number of times that the interference detection unit 62 detects interference can be reduced. Thus, the operational efficiency associated with interference with respect to the head 36 can be improved.

(1-9) When interference with respect to the head 36 is not detected at the detection position, the control unit 53 performs adjustment so that the interval between the head 36 and the support surface 29 is increased by the fine adjustment interval. Thus, the number of times that the interference detection unit 62 detects interference can be reduced. Thus, the operational efficiency associated with interference with respect to the head 36 can be improved.

(1-10) The medium support unit 28 includes the support surface 29 that supports at least the printing region of the medium. The medium accommodation unit 30 is capable of accommodating a partial region of the medium that is not supported by the support surface 29. The medium support unit 28 is configured not to move in the direction parallel to the support surface 29. The moving unit 40 moves the head 36 in the direction parallel to the support surface 29. In the related art, it is necessary for the tray to be moved to the outside of the housing in order to place the medium, and a mechanism for stably moving the tray to the outside of the housing is required, which causes an increase in the size of the printing apparatus. Here, by adopting the above-described configuration, it is not necessary to provide a configuration for moving the support surface 29 in the direction parallel to the support surface 29. Accordingly, the size of the printing apparatus 10 can be reduced. In particular, even in a case in which the configuration including the medium accommodation unit 30 is assumed, the size of the printing apparatus 10 can be reduced.

(1-11) The first moving unit 41 moves the head 36 in the width direction X, and the second moving unit 43 moves the head 36 in the front-rear direction Y. Thus, the head 36 can be moved in the width direction X and the front-rear direction Y, and it is not necessary to provide a configuration for moving the support surface 29 in the direction parallel to the support surface 29. Accordingly, the size of the printing apparatus 10 can be reduced.

(1-12) The moving unit 40 is accommodated in the housing 11. Thus, the head 36 can be moved in the horizontal direction in the state in which the moving unit 40 is accommodated in the housing 11, and it is possible to change a relative positional relationship between the head 36 and the support surface 29 in the horizontal direction. With this, it is not necessary to provide a configuration for moving the support surface 29 in the direction parallel to the support surface 29. Accordingly, the size of the printing apparatus 10 can be reduced.

(1-13) When viewed from the vertical direction Z, the opening 19 has a shape longer than the support surface 29 in the width direction X. For this reason, when placing the medium on the support surface 29, handling of the medium in the width direction X becomes easy, and the operability for the user can thus be improved.

(1-14) The housing 11 accommodates the medium support unit 28 and the printing unit 35. In a case in which printing is not being performed, when the head 36 is arranged at the retracted position at which the nozzle surface 38 does not face the support surface 29, the position adjustment unit 63 is capable of moving the support surface 29 from being outside the movement range 46 of the head 36 to being within the movement range 46. In the related art, it is necessary to move the tray to the outside of the housing in order to place the medium. Therefore, a space for placing the medium is required to be secured on the outside of the housing. Therefore, it is necessary to secure a sufficient installation space for installing the printing apparatus. Here, by adopting the above-described configuration, since the medium support unit 28 and the printing unit 35 are accommodated in the housing 11, it is not necessary to secure the space for placing the medium on the outside of the housing 11. Thus, the installation space of the printing apparatus 10 can be reduced.

(1-15) Further, in addition to this, as long as printing is not being performed and the head 36 is arranged at the retracted position, the support surface 29 can be moved from being outside the movement range 46 of the head 36 to being within the movement range 46. Thus, when placing the medium on the support surface 29, the handling of the medium becomes easy, and it is possible to improve the operability for the user. Further, the installation space of the printing apparatus 10 can be reduced.

(1-16) The housing 11 includes the opening 19 that exposes the support surface 29. For this reason, it is possible to place the medium on the support surface 29 accommodated in the housing 11 from the outside of the housing 11 through the opening 19, and it is possible to improve the operability for the user.

(1-17) The housing 11 includes the opening/closing cover 22 that is capable of opening and closing the opening 19. Thus, when the opening 19 is opened by the opening/closing cover 22, it is possible to place the medium on the support surface 29 accommodated in the housing 11 from the outside of the housing 11 through the opening 19, and operability for the user can thus be improved. On the other hand, when the opening 19 is closed by the opening/closing cover 22, it is possible to prevent a foreign matter from entering the inside of the housing 11 from the outside of the housing 11 through the opening 19.

(1-18) The movement range 46 of the head 36 includes the position at which the nozzle surface 38 faces the maintenance unit 47. Thus, it is possible to perform maintenance of the nozzle surface 38 by moving the nozzle surface 38 to the position facing the maintenance unit 47, and it is possible to suppress a decrease in printing quality.

(1-19) The maintenance unit 47 includes the flushing portion 48 that receives the liquid ejected from the head 36. Thus, by moving the nozzle surface 38 to the position facing the flushing portion 48, it is possible to receive the liquid ejected from the head 36, and it is possible to suppress a decrease in the printing quality.

(1-20) The maintenance unit 47 includes the wiping portion 49 that can wipe the nozzle surface 38. Thus, it is possible to wipe the nozzle surface 38 by moving the nozzle surface 38 to the position facing the wiping portion 49, and it is possible to suppress a decrease in the printing quality.

(1-21) When printing is not being performed, when the head 36 is arranged at the retracted position, the position adjustment unit 63 is capable of moving the support surface 29 to a position higher than the nozzle surface 38 in the vertical direction Z. Therefore, when printing is not being performed and the head 36 is arranged at the retracted position, the support surface 29 can be moved to a position higher than the nozzle surface 38. Thus, when placing the medium on the support surface 29, the user can perform the operation at a position close to the user, using the first opening 20 in the housing 11. Therefore, handling of the medium becomes easy, and it is possible to improve operability for the user.

Second Exemplary Embodiment

Next, a second exemplary embodiment is described. In the second exemplary embodiment, the control unit 53 may perform the adjustment control for performing adjustment so that the interval between the head 36 and the support surface 29 is increased after performing the stop control, and may perform the second movement control. In the following description, the same configurations as those in the exemplary embodiment described above are denoted with the same reference symbols, and redundant description therefor is omitted or simplified.

Figure 12:
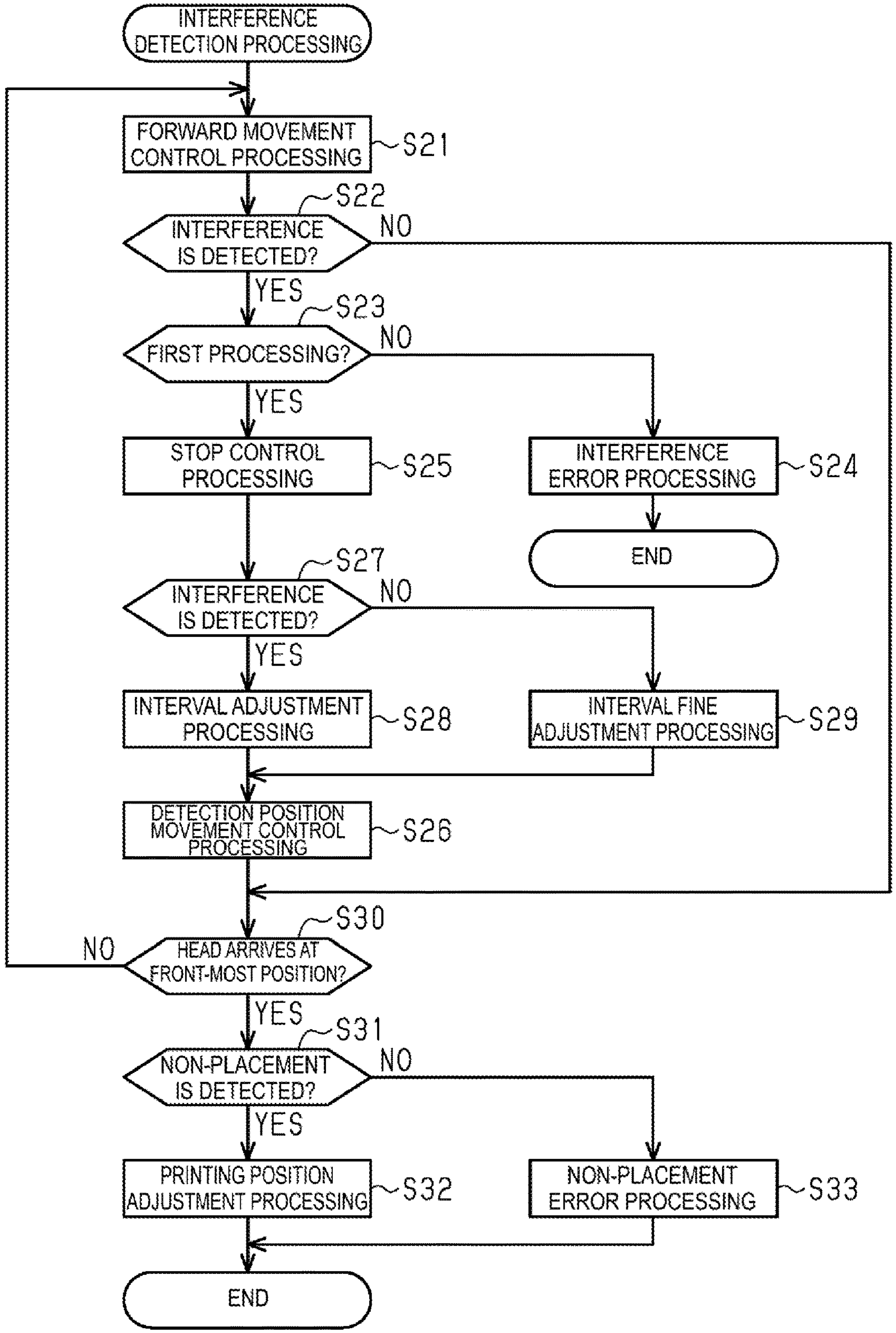
FIG. 12 is a flowchart illustrating the interference detection processing.

As illustrated in FIG. 12, in the second exemplary embodiment, in the interference detection processing, the control unit 53 shifts the processing to step S 27 after executing step S25. With this, the control unit 53 performs the adjustment control after performing the stop control.

Further, the control unit 53 shifts the processing to step S26 after terminating steps S28 and S29. The control unit 53 shifts the processing to step S30 after terminating step S26. In this manner, as a result of moving the interference detection unit 62 to the detection position, the control unit 53 performs the third movement control without performing detection interference with respect to the head 36. In other words, even when interference is detected as a result of moving the interference detection unit 62 to the detection position, the control unit 53 does not perform the adjustment control.

Effects of Second Embodiment

Effects of the second exemplary embodiment are described.

(2-1) The control unit 53 performs the adjustment control after performing the stop control. Thus, even when interference is detected as a result of moving the interference detection unit 62 to the front side Y1, the control unit 53 is capable of stopping the interference detection unit 62 at the stop position and then performing adjustment so that the interval between the head 36 and the support surface 29 is increased. In general, when the medium is supported by the support surface 29 so that the medium is inclined upward to the front side Y1, frequency at which adjustment for increasing the interval between the head 36 and the support surface 29 is required is higher at the stop position than at the detection position. In particular, when the medium has flexibility, the medium is highly likely to be inclined upward continuously from the detection position. Thus, after the interference detection unit 62 stops at the stop position, and adjustment is performed so that the interval between the head 36 and the support surface 29 is increased. With this, the number of times that the interference detection unit 62 detects interference can be reduced. Thus, the operational efficiency associated with interference with respect to the head 36 can be improved.

(2-2) The control unit 53 performs the second movement control after performing the adjustment control. Even when interference is detected as a result of moving the interference detection unit 62 to the detection position, the control unit 53 does not perform the adjustment control. Thus, even when interference is detected at the detection position after the adjustment control is performed at the stop position, the adjustment control is not performed. With this, the number of times that the control unit 53 performs the adjustment control can be reduced. Thus, the operational efficiency associated with interference with respect to the head 36 can be improved.

Third Exemplary Embodiment

Next, a third exemplary embodiment is described. In the third exemplary embodiment, the control unit 53 may perform the adjustment control for performing adjustment so that the interval between the head 36 and the support surface 29 is increased after performing the stop control. When interference is detected at the detection position as a result of performing the second movement control, the adjustment control may be performed again.

Figure 13:
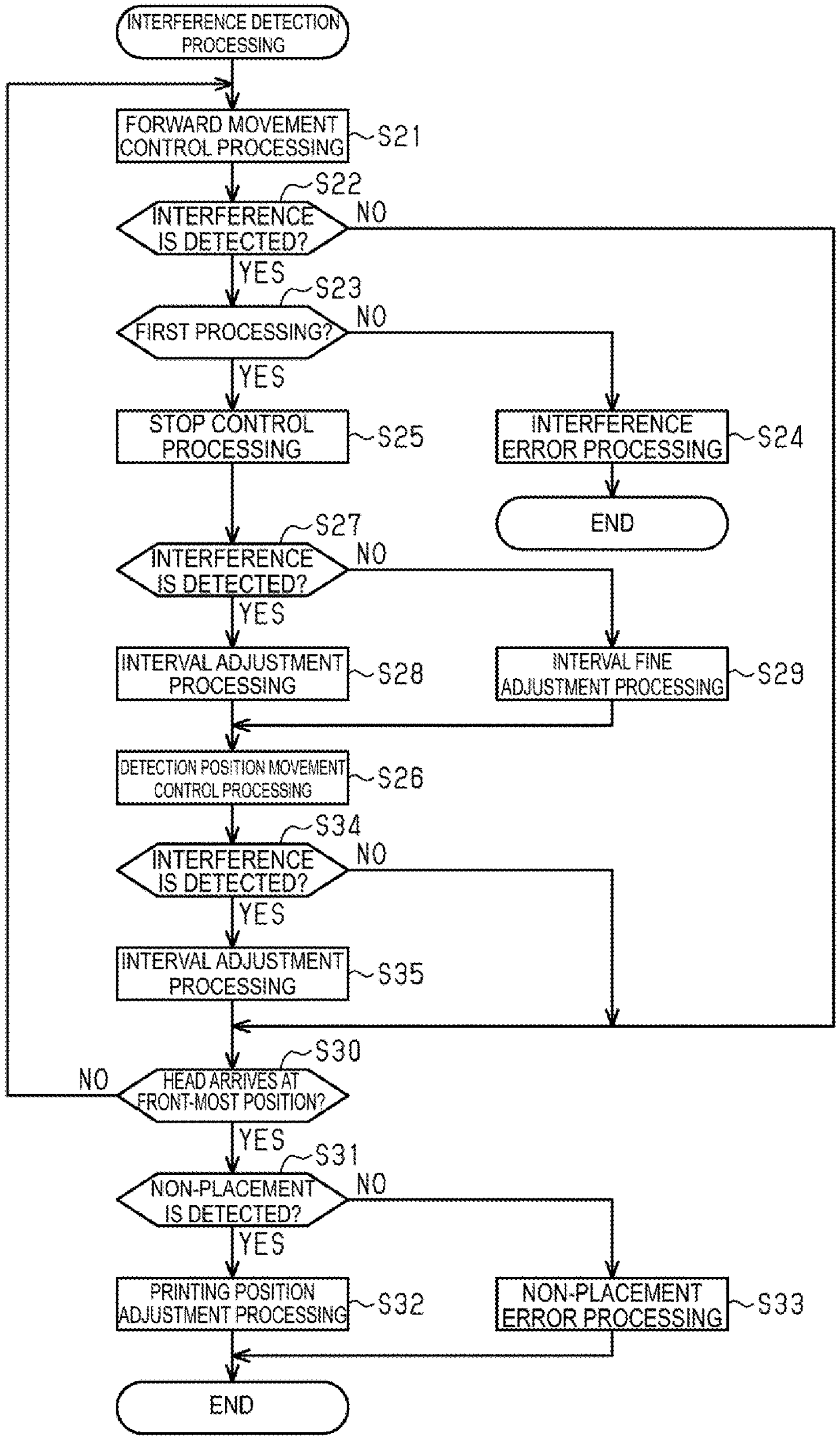
FIG. 13 is a flowchart illustrating the interference detection processing.

As illustrated in FIG. 13, in the third exemplary embodiment, in the interference detection processing, the control unit 53 shifts the processing to step S34 after terminating step S26. In step S34, which is similar to step S22, the control unit 53 determines whether interference with respect to the head 36 is detected, based on the detection signal from the interference detection unit 62. When the control unit 53 determines that interference with respect to the head 36 is not detected, the control unit 53 shifts the processing to step S30 without executing step S35. On the other hand, when the control unit 53 determines that interference with respect to the head 36 is detected, the control unit 53 shifts the processing to step S35. In step S35, which is similar to step S28, the control unit 53 executes the interval adjustment processing. With this, when interference is detected as a result of moving the interference detection unit 62 to the detection position, the control unit 53 performs the adjustment control again.

Effects of Third Embodiment

Effects of the third exemplary embodiment are described.

(3-1) The control unit 53 performs the adjustment control for performing adjustment so that the interval between the head 36 and the support surface 29 is increased, and then performs the second movement control. When interference is detected as a result of moving the interference detection unit 62 to the detection position, the control unit 53 performs the adjustment control again. Thus, when interference is detected at the detection position after the adjustment control is performed at the stop position, the adjustment control can be performed again. With this, the number of times that the control unit 53 performs the adjustment control can be increased. Therefore, possibility of interference with respect to the head 36 can be reduced.

Fourth Exemplary Embodiment

Next, a fourth exemplary embodiment is described. In the fourth exemplary embodiment, the interference detection unit 62 may include the plurality of systems of sensors. Further, the control unit 53 may perform detection of interference with respect to the head 36, based on a result detected by each of the plurality of systems of sensors. The control unit 53 may perform the adjustment control, based on a result detected by each of the plurality of systems of sensors.

Figure 14:
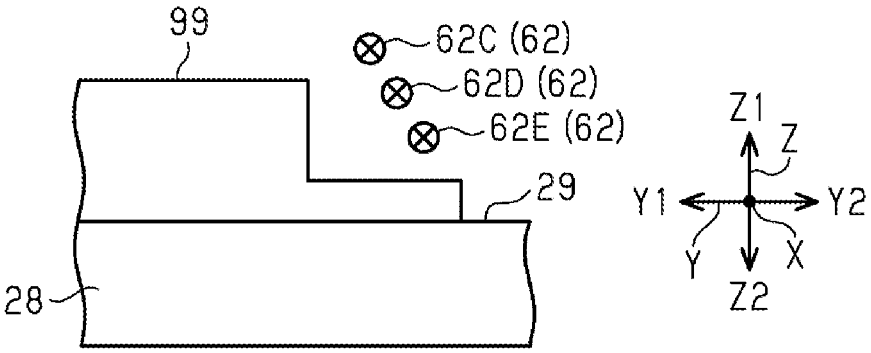
FIG. 14 is a schematic view illustrating the interference detection unit and the support surface.

As illustrated in FIG. 14, the interference detection unit 62 may include the plurality of systems of sensors. The interference detection unit 62 may include a first sensor 62C, a second sensor 62D, and a third sensor 62E.

Specifically, the first sensor 62C may be located on the upper side Z1 with respect to the second sensor 62D. The second sensor 62D may be located on the upper sized Z1 with respect to the third sensor 62E. The first sensor 62C may be located on the front side Y1 with respect to the second sensor 62D. The second sensor 62D may be located on the front side Y1 with respect to the third sensor 62E.

The plurality of systems of sensors may be arranged at an equal interval in the vertical direction Z. The interval between the plurality of systems of sensors in the vertical direction Z may be an interval larger than the minimum interval by which the support surface 29 is moved in the vertical direction Z. When the interval is larger than the minimum interval by which the support surface 29 is moved in the vertical direction Z, the support surface 29 can be adjusted finely in the vertical direction Z with respect to the sensors. The minimum interval by which the support surface 29 is moved in the vertical direction Z may be determined based on a moving speed for moving the support surface 29 in the vertical direction Z and characteristics of the position adjustment unit 63.

The plurality of systems of sensors may be arranged at an equal interval in the front-rear direction Y. The interval between the plurality of systems of sensors in the front-rear direction Y may be an interval larger than the minimum interval by which the interference detection unit 62 is moved in the front-rear direction or an interval equal to the minimum interval, or may be an interval smaller than the minimum interval. When the interval between the plurality of systems of sensors in the front-rear direction Y is an interval smaller than the minimum interval by which the interference detection unit 62 is moved in the front-rear direction, the plurality of systems of sensors can be handled while assuming that the plurality of systems of sensors are arranged at the same position in the front-rear direction Y. The minimum interval by which the interference detection unit 62 is moved in the front-rear direction may be determined based on a moving speed for moving the interference detection unit 62 in the front-rear direction Y and characteristics of the second driving unit 56.

Further, in the interference detection processing, the control unit 53 may determine whether interference with respect to the head 36 is detected, based on a result detected by each of the plurality of systems of sensors. Further, the control unit 53 may execute the interval adjustment processing and the interval fine adjustment processing, based on the result detected by each of the plurality of systems of sensors.

Effects of Fourth Embodiment

Effects of the fourth exemplary embodiment are described.

(4-1) The interference detection unit 62 includes the plurality of systems of sensors, and each of the plurality of systems of sensors detects interference with respect to the head 36. Thus, a condition of the medium placed on the support surface 29, for example, undulations on the medium placed on the support surface 29 can be detected. Thus, the operational efficiency associated with interference with respect to the head 36 can be improved. At the same time, the detection accuracy of interference with respect to the head 36 can be improved.

(4-2) The control unit 53 performs the adjustment control, based on a result detected by each of the plurality of systems of sensors. Thus, a condition of the medium placed on the support surface 29, for example, undulations on the medium placed on the support surface 29 can be detected. Thus, the operational efficiency associated with interference with respect to the head 36 can be improved. At the same time, the detection accuracy of interference with respect to the head 36 can be improved.

Modified Examples

The present exemplary embodiment can be modified and implemented as follows. The present exemplary embodiment and the following modified examples can be combined and implemented insofar as no technical contradictions arise.

In the third exemplary embodiment, when the control unit 53 determines that interference with respect to the head 36 is not detected in step S34, the control unit 53 may shift the processing to step S30 after executing the interval fine adjustment processing.

In a case in which the interference detection unit 62 is moved from the stop position to the detection position after detection of interference, when the interference detection unit 62 does not actually detect interference, the control unit 53 may not execute the fine adjustment processing. In this case, the control unit 53 may not store the fine adjustment interval.

When the interval between the head 36 and the support surface 29 is adjusted as a result of detection of interference by the interference detection unit 62, the control unit 53 may not perform adjustment of the fine adjustment interval after the interference detection unit 62 does not detect interference. In this case, the control unit 53 may not store the fine adjustment interval.

When the interference detection unit 62 detects interference, the control unit 53 may stop the interference detection unit 62 at a position shifted from the detection position to the front side Y1 by a desired distance. In this case, the control unit 53 may specify the stop distance from the detection position to the stop position, based on the detection signal from the second movement position detection unit 61. Further, the control unit 53 may move the interference detection unit 62 to the detection position by moving the interference detection unit 62 from the stop position to the rear side Y2 by the stop distance.

When the interference detection unit 62 detects interference, the interference detection unit 62 is stopped at the stop position that is shifted from the detection position to the front side Y1 by the braking distance, and then is moved from the stop position to the rear side Y2. In such movement, the control unit 53 may move the interference detection unit 62 to a position other than the detection position. In other words, a position other than the detection position may be the predetermined position. Further, the predetermined position may not include the standby position, and may be a position on the front side Y1 with respect to the standby position.

The control unit 53 may not detect the non-placement error. When the interval between the head 36 and the support surface 29 is an upper limit value, the control unit 53 may determine that the interference error occurs. In a case in which printing on a subsequent layer is performed on the medium, when the interference detection unit 62 detects interference, the control unit 53 may not determine that the interference error occurs.

The control unit 53 may adjust the interval between the head 36 and the support surface 29 by moving the head 36 and the interference detection unit 62 in the vertical direction Z. The control unit 53 may adjust the interval between the head 36 and the support surface 29 by a combination of movement of the support surface 29 in the vertical direction Z and movement of the head 36 and the interference detection unit 62 in the vertical direction Z.

In plan view, the first opening 20 may have a shape having the same length as the support surface 29 in the front-rear direction Y, or may have a shape longer than the support surface 29 in the front-rear direction Y. In plan view, the first opening 20 may have a shape having the same length as the support surface 29 in the width direction X, or may have a shape shorter than the support surface 29 in the width direction X.

The first opening 20 and the second opening 21 need not necessarily be continuous with each other and may be provided separately from each other. The opening 19 need not necessarily be provided across the top surface 16 and the front surface 12.

The opening 19 may be provided across the top surface 16, the front surface 12, and the other surfaces. In other words, the opening 19 may be provided across at least the top surface 16 and the front surface 12. The opening 19 may be provided at the top surface 16 and not be provided at the front surface 12. In other words, it is only required that the opening 19 be provided at least at the top surface 16.

The support surface 29 is configured not to move in the horizontal direction. However, for example, the support surface 29 may be finely adjustable in the horizontal direction only when printing is not being performed, and it is only required that the support surface 29 be configured not to move in the horizontal direction at least when printing is being performed.

The first opening 20 may have a shape that is longer than the support surface 29 in the front-rear direction Y when viewed from the upper side Z1.

When maintenance is performed in a state in which printing is not being performed, the position adjustment unit 63 may move the support surface 29 from the placement position to the printing position. When maintenance, such as flushing, is performed in a state in which printing is being performed, the position adjustment unit 63 may continuously arrange the support surface 29 at the printing position.

The position adjustment unit 63 may adjust the position of the support surface 29 in the vertical direction Z from the printing position to the placement position when the opening 19 is opened by the opening/closing cover 22. The position adjustment unit 63 may adjust the position of the support surface 29 in the vertical direction Z from the placement position to the printing position when the opening 19 is closed by the opening/closing cover 22.

In the single print command, the printing unit 35 may perform printing when the head 36 is moved a plurality of times in the front-rear direction Y, and may perform printing when the head 36 is moved once in the front-rear direction Y.

The printing unit 35 may perform printing when the head 36 moves to either one of the front side Y1 and the rear side Y2, or may perform printing both when the head 36 moves to the front side Y1 and when the head 36 moves to the rear side Y2.

The printing unit 35 may perform printing when the head 36 moves in any one of the first width direction X1 and the second width direction X2, or may perform printing both when the head 36 moves in the first width direction X1 and when the head 36 moves in the second width direction X2.

The head 36 may include the nozzle surface 38 that is parallel to the horizontal plane or may include the nozzle surface 38 that is inclined with respect to the horizontal plane.

The maintenance unit 47 need not necessarily include at least one of the flushing portion 48, the wiping unit 49, the suction portion 50, and the waste liquid tank 51.

The printing apparatus 10 may not include the standby position detection unit 57 as long as the first movement position detection unit 58 is capable of detecting that the head 36 is arranged at the standby position. The printing apparatus 10 may not include the front position detection unit 59 as long as the second movement position detection unit 61 is capable of detecting that the head 36 is arranged at the front-most position. The printing apparatus 10 may not include the rear position detection unit 60 as long as the second movement position detection unit 61 is capable of detecting that the head 36 is arranged at the rear-most position.

The relationship between the width direction X and the front-rear direction Y in the present exemplary embodiment may be switched. In other words, the width direction X of the present exemplary embodiment may be the front-rear direction Y, and the front-rear direction Y of the present exemplary embodiment may be the width direction X.

For example, the medium is not limited to the T-shirt, a polo shirt, or the like, and may be a sweatshirt, a hooded sweatshirt, or the like, for example, or may be a medium such as clothing. Further, the medium having flexibility is adopted as the medium, but the medium is not limited to this example, and a medium having no flexibility, such as a smartphone case printed using UV ink, may be adopted, for example.

The printing apparatus 10 may be configured to eject ink as an example of the liquid, but may be configured to eject a liquid other than ink.

In other words, the liquid can be selected as desired as long as it can perform printing on the medium by adhering to the medium.

As used herein, the phrase "at least one of" means one or more of specific alternatives. As an example, the phrase "at least one of" as used herein means only one alternative or both of two alternatives, when the number of alternatives is two. As another example, the phrase "at least one of" as used herein means only one alternative, or any combination of two or more alternatives, when the number of alternatives is three or more.

Supplementary Notes

Hereinafter, technical concepts and effects thereof that are understood from the above-described exemplary embodiments and modified examples are described.

(A) A printing apparatus includes a medium support unit including a support surface configured to support at least a printing region of a medium, a medium accommodation unit configured to accommodate a region of the medium that is not supported by the support surface, a head configured to eject a liquid onto the medium supported by the support surface, an interference detection unit configured to detect interference with respect to the head, a first moving unit configured to move the head in a first direction parallel to the support surface, a second moving unit configured to move the interference detection unit together with the head in a second direction being parallel to the support surface and intersecting with the first direction, a position adjustment unit configured to adjust an interval between the head and the support surface in a third direction intersecting with the support surface, and a control unit configured to control the first moving unit, the second moving unit, and the position adjustment unit, wherein the control unit performs stop control for stopping the interference detection unit at a stop position when the interference detection unit detects interference as a result of performing first movement control for moving the interference detection unit to one side in the second direction, performs second movement control for moving the interference detection unit to a predetermined position to the other side opposite to the one side in the second direction, then performs third movement control for moving the interference detection unit to the one side, and performs adjustment control for causing the position adjustment unit to perform adjustment to increase the interval between the head and the support surface, based on a detection result by the interference detection unit between the stop control and the third movement control.

With this configuration, even when the interference detection unit detects interference, the control unit is capable of stopping the interference detection unit at the stop position and then moving the interference detection unit to the predetermined position to the other side. After that, the control unit is capable of performing the adjustment control again before moving the interference detection unit to the one side. Thus, the operational efficiency associated with interference with respect to the head can be improved.

(B) The printing apparatus described above may include a position detection unit configured to detect a position of the interference detection unit in the second direction, wherein the control unit may specify a detection position at which the interference detection unit detects interference, as the predetermined position.

With this configuration, even when the interference detection unit detects interference, the control unit is capable of stopping the interference detection unit at the stop position and then moving the interference detection unit to the detection position to the other side. After that, the control unit is capable of performing the adjustment control again before moving the interference detection unit to the one side. Thus, the operational efficiency associated with interference with respect to the head can be improved.

(C) In the printing apparatus described above, the control unit may perform the second movement control and then perform the adjustment control.

With this configuration, even when the interference detection unit detects interference as a result of moving the interference detection unit to the one side, the control unit is capable of performing adjustment to increase the interval between the head and the support surface after moving the interference detection unit from the stop position to the predetermined position on the other side. With this, adjustment can be performed at the predetermined position on the other side with respect to the stop position instead of the stop position, based on the detection result by the interference detection unit, so that the interval between the head and the support surface is increased. Thus, the operational efficiency associated with interference with respect to the head can be improved.

(D) In the printing apparatus described above, the control unit may perform the stop control and then perform the adjustment control.

With this configuration, even when the interference detection unit detects interference as a result of moving the interference detection unit to the one side, the control unit is capable of performing adjustment to increase the interval between the head and the support surface after stopping the interference detection unit at the stop position. When the medium is supported by the support surface so that the medium is inclined upward to the one side, frequency at which adjustment for increasing the interval between the head and the support surface is required is higher at the stop position than at the predetermined position. Thus, after the interference detection unit stops at the stop position, and adjustment is performed so that the interval between the head and the support surface is increased. With this, the number of times that the interference detection unit detects interference can be reduced. Thus, the operational efficiency associated with interference with respect to the head can be improved.

(E) In the printing apparatus described above, the control unit may perform the adjustment control and then perform the second movement control, and may not perform the adjustment control even when the interference detection unit detects interference as a result of moving the interference detection unit to the predetermined position.

With this configuration, even when the adjustment control is performed at the stop position, and then the interference detection unit detects interference at the predetermined position, the adjustment control is not performed. With this, the number of times that the interference detection unit detects interference with respect to the head can be reduced. Thus, the operational efficiency associated with interference with respect to the head can be improved.

(F) In the printing apparatus described above, the control unit may perform the adjustment control and then perform the second movement control, and may perform the adjustment control again when the interference detection unit detects interference as a result of moving the interference detection unit to the predetermined position.

With this configuration, when the adjustment control is performed at the stop position, and then the interference detection unit detects interference at the predetermined position, the adjustment control can be performed again. With this, the number of times that the interference detection unit detects interference with respect to the head can be reduced. Thus, the operational efficiency associated with interference with respect to the head can be improved. At the same time, the detection accuracy of interference with respect to the head can be improved.

(G) In the printing apparatus described above, the control unit may perform the adjustment control for causing the position adjustment unit to perform adjustment to increase the interval between the head and the support surface beyond a boundary position beyond which the interference detection unit does not detect interference, and may cause the position adjustment unit to perform adjustment so that the interval between the head and the support surface is a prescribed interval when detection of interference by the interference detection unit is completed as a result of moving the interference detection unit to the one side.

With this configuration, with regard to the interval between the head and the support surface, the interference detection unit is not returned to the boundary position beyond which interference is not detected, which is different from movement of the interference detection unit in the second direction. In particular, the interval between the head and the support surface can be adjusted so that the interval between the head and the support surface is the prescribed interval, in consideration of the fact that the interference detection unit is not returned when detection of interference is completed. Thus, the operational efficiency associated with interference with respect to the head can be improved.

(H) In the printing apparatus described above, the control unit may perform the adjustment control for causing the position adjustment unit to perform adjustment so that the interval between the head and the support surface is further increased by a fine adjustment interval beyond the boundary position beyond which the interference detection unit does not detect interference, and may cause the position adjustment unit to perform adjustment so that the interval between the head and the support surface is the prescribed interval, based on a difference between the prescribed interval and the fine adjustment interval, when detection of interference by the interference detection unit is completed as a result of moving the interference detection unit to the one side.

With this configuration, with regard to the interval between the head and the support surface, the interference detection unit is further moved by the fine adjustment interval from the boundary position beyond which interference is not detected, which is different from movement of the interference detection unit in the second direction. In particular, the interval between the head and the support surface is adjusted by a difference between the prescribed interval and the fine adjustment interval so that the interval between the head and the support surface is the prescribed interval, in consideration of the fact that the interval between the head and the support surface is increased in addition by the fine adjustment interval at the time of completion of detection of interference with respect to the head. Thus, the operational efficiency associated with interference with respect to the head can be improved.

(I) In the printing apparatus described above, the interference detection unit may include a plurality of systems of sensors, and each of the plurality of systems of sensors may detect interference with respect to the head.

With this configuration, interference with respect to the head can be detected by using the plurality of systems of sensors. With this, a condition of the medium placed on the support surface, for example, undulations on the medium placed on the support surface can be detected. Thus, the operational efficiency associated with interference with respect to the head can be improved. At the same time, the detection accuracy of interference with respect to the head can be improved.

(J) In the printing apparatus described above, the control unit may perform the adjustment control, based on a result detected by each of the plurality of systems of sensors.

With this configuration, the adjustment control is performed based on a result detected by each of the plurality of systems of sensors. With this, a condition of the medium placed on the support surface, for example, undulations on the medium placed on the support surface can be detected. Thus, the operational efficiency associated with interference with respect to the head can be improved. At the same time, the detection accuracy of interference with respect to the head can be improved.

(K) A method of controlling a printing apparatus includes: executing, by a control unit of a printing apparatus, first-direction movement control processing for moving a head in a first direction parallel to a support surface configured to support at least a printing region of a medium, the head being configured to eject a liquid onto the medium supported by the support surface; and second-direction movement control processing for moving an interference detection unit in a second direction being parallel to the support surface and intersecting with the first direction, the interference detection unit being configured to detect interference with respect to the head, wherein the control unit of the printing apparatus executes first movement control processing for moving the interference detection unit to one side in the second direction in the second-direction movement control processing, stop control processing for stopping the interference detection unit at a stop position in the second-direction movement control processing when the interference detection unit detects interference as a result of executing the first movement control processing, second movement control processing for moving the interference detection unit to a predetermined position to the other side opposite to the one side in the second direction in the second-direction movement control processing after the stop control processing is executed, third movement control processing for moving the interference detection unit to the one side again in the second-direction movement control processing after the second movement control processing is executed, and adjustment control processing for performing adjustment so that an interval between the head and the support surface is increased in a third direction intersecting with the support surface, based on a detection result by the interference detection unit between the stop control processing and the third movement control processing in the second-direction movement control processing. With this configuration, the same effects as for (A) can be obtained.

What is claimed is:

1. A printing apparatus, comprising:

a medium support unit including a support surface configured to support at least a printing region of a medium;

a medium accommodation unit configured to accommodate a region of the medium that is not supported by the support surface;

a head configured to eject a liquid onto the medium supported by the support surface;

an interference detection unit configured to detect interference with respect to the head;

a first moving unit configured to move the head in a first direction parallel to the support surface;

a second moving unit configured to move the interference detection unit together with the head in a second direction being parallel to the support surface and intersecting with the first direction;

a position adjustment unit configured to adjust an interval between the head and the support surface in a third direction intersecting with the support surface; and a control unit configured to control the first moving unit, the second moving unit, and the position adjustment unit, wherein the control unit performs stop control for stopping the interference detection unit at a stop position when the interference detection unit detects interference as a result of performing first movement control for moving the interference detection unit to one side in the second direction, performs second movement control for moving the interference detection unit to a predetermined position to the other side opposite to the one side in the second direction, then performs third movement control for moving the interference detection unit to the one side, and performs adjustment control for causing the position adjustment unit to perform adjustment to increase the interval between the head and the support surface, based on a detection result by the interference detection unit between the stop control and the third movement control.

2. The printing apparatus according to claim 1, comprising:

a position detection unit configured to detect a position of the interference detection unit in the second direction, wherein the control unit specifies a detection position at which the interference detection unit detects interference, as the predetermined position.

3. The printing apparatus according to claim 1, wherein the control unit performs the second movement control, and then performs the adjustment control.

4. The printing apparatus according to claim 1, wherein the control unit performs the adjustment control after performing the stop control.

5. The printing apparatus according to claim 4, wherein the control unit performs the adjustment control and then performs the second movement control, and does not perform the adjustment control even when the interference detection unit detects interference as a result of moving the interference detection unit to the predetermined position.

6. The printing apparatus according to claim 4, wherein the control unit performs the adjustment control and then performs the second movement control, and performs the adjustment control again when the interference detection unit detects interference as a result of moving the interference detection unit to the predetermined position.

7. The printing apparatus according to claim 1, wherein the control unit performs the adjustment control for causing the position adjustment unit to perform adjustment to increase the interval between the head and the support surface beyond a boundary position beyond which the interference detection unit does not detect interference, and causes the position adjustment unit to perform adjustment so that the interval between the head and the support surface is a prescribed interval when detection of interference by the interference detection unit is completed as a result of moving the interference detection unit to the one side.

8. The printing apparatus according to claim 7, wherein the control unit performs the adjustment control for causing the position adjustment unit to perform adjustment so that the interval between the head and the support surface is further increased by a fine adjustment interval beyond the boundary position beyond which the interference detection unit does not detect interference, and causes the position adjustment unit to perform adjustment so that the interval between the head and the support surface is the prescribed interval, based on a difference between the prescribed interval and the fine adjustment interval, when detection of interference by the interference detection unit is completed as a result of moving the interference detection unit to the one side.

9. The printing apparatus according to claim 1, wherein the interference detection unit includes a plurality of systems of sensors, and each of the plurality of systems of sensors detects interference with respect to the head.

10. The printing apparatus according to claim 9, wherein the control unit performs the adjustment control, based on a result detected by each of the plurality of systems of sensors.

11. A method of controlling a printing apparatus, the method comprising:

executing, by a control unit of a printing apparatus, first-direction movement control processing for moving a head in a first direction parallel to a support surface configured to support at least a printing region of a medium, the head being configured to eject a liquid onto the medium supported by the support surface; and second-direction movement control processing for moving an interference detection unit in a second direction being parallel to the support surface and intersecting with the first direction, the interference detection unit being configured to detect interference with respect to the head, wherein the control unit of the printing apparatus executes first movement control processing for moving the interference detection unit to one side in the second direction in the second-direction movement control processing, stop control processing for stopping the interference detection unit at a stop position in the second-direction movement control processing when the interference detection unit detects interference as a result of executing the first movement control processing, second movement control processing for moving the interference detection unit to a predetermined position to the other side opposite to the one side in the second direction in the second-direction movement control processing after the stop control processing is executed, third movement control processing for moving the interference detection unit to the one side again in the second-direction movement control processing after the second movement control processing is executed, and adjustment control processing for performing adjustment so that an interval between the head and the support surface is increased in a third direction intersecting with the support surface, based on a detection result by the interference detection unit between the stop control processing and the third movement control processing in the second-direction movement control processing.

* * * * *